(12) United States Patent
Mate et al.

(10) Patent No.: US 11,711,505 B2
(45) Date of Patent: Jul. 25, 2023

(54) VIEWPORT DEPENDENT DELIVERY METHODS FOR OMNIDIRECTIONAL CONVERSATIONAL VIDEO

(71) Applicant: Nokia Technologies Oy, Espoo (FI)

(72) Inventors: Sujeet Shyamsundar Mate, Tampere (FI); Igor Danilo Diego Curcio, Tampere (FI); Saba Ahsan, Espoo (FI); Emre Aksu, Tampere (FI); Miska Matias Hannuksela, Tampere (FI); Yu You, Kangasala (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/376,345

(22) Filed: Jul. 15, 2021

(65) Prior Publication Data

US 2022/0021864 A1 Jan. 20, 2022

Related U.S. Application Data

(60) Provisional application No. 63/052,577, filed on Jul. 16, 2020.

(51) Int. Cl.
*H04N 13/161* (2018.01)
*H04N 19/597* (2014.01)
(Continued)

(52) U.S. Cl.
CPC ......... *H04N 13/161* (2018.05); *H04N 13/111* (2018.05); *H04N 13/194* (2018.05); *H04N 19/597* (2014.11)

(58) Field of Classification Search
CPC .. H04N 13/161; H04N 13/111; H04N 13/194; H04N 19/597; H04N 7/147;
(Continued)

(56) References Cited

U.S. PATENT DOCUMENTS

2014/0320587 A1 10/2014 Oyman ................. 348/14.07
2018/0124146 A1* 5/2018 Chen ....................... H04L 65/61
(Continued)

FOREIGN PATENT DOCUMENTS

WO WO-2019073112 A1 * 4/2019 .......... H04N 13/161
WO WO-2019141901 A1 7/2019
(Continued)

OTHER PUBLICATIONS

3GPP TSG-SA4 Meeting #109e "ITT4RT Permanent Document—Requirements, Working Assumptions and Potential Solutions" Intel, Nokia Corporation (ITT4RT Co-Rapporteurs) S4-200840. Online Meeting, May 20-Jun. 3, 2020.
(Continued)

*Primary Examiner* — Thai Q Tran
*Assistant Examiner* — Stephen R Smith
(74) *Attorney, Agent, or Firm* — Harrington & Smith

(57) ABSTRACT

A user equipment, media control unit, media resource function, or another device or function capable of receiving, manipulating, and transmitting data may be configured to: receive an omnidirectional video; determine a viewport of a user equipment; determining a delivery mode; determine a region of the omnidirectional video based, at least partially, on the determined viewport and the determined delivery mode; encode the determined region; packetizing the encoded region; and transmit the packetized region to the user equipment based, at least partially, on the determined delivery mode.

20 Claims, 14 Drawing Sheets

(51) Int. Cl.
*H04N 13/194* (2018.01)
*H04N 13/111* (2018.01)

(58) Field of Classification Search
CPC ..... H04N 21/234354; H04N 21/23439; H04N 21/4728; H04N 21/4788; H04N 21/6437; H04N 21/6587; H04L 65/612; H04L 65/65; H04L 65/70; H04L 65/80
USPC .......................................................... 348/43
See application file for complete search history.

(56) References Cited

U.S. PATENT DOCUMENTS

| | | | |
|---|---|---|---|
| 2018/0249163 A1* | 8/2018 | Curcio | H04N 13/332 |
| 2020/0043133 A1* | 2/2020 | Boyce | G06T 3/60 |
| 2021/0021806 A1* | 1/2021 | He | H04N 21/21805 |
| 2022/0078396 A1* | 3/2022 | Gül | H04N 21/816 |

FOREIGN PATENT DOCUMENTS

| | | |
|---|---|---|
| WO | WO-2021105552 A1 | 6/2021 |
| WO | 2021/214379 A1 | 10/2021 |

OTHER PUBLICATIONS

H. Schulzrinne, S. Casner, R. Frederick, and V. Jacobson "RTP: A Transport Protocol for Real-Time Applications" Jan. 1996.

J. Ott, S. Wenger, N. Sato, C. Burmeister, and J. Rey Extended RTP Profile for Real-Time Transport Control Protocol (RTCP)-Based Feedback (RTP/AVPF) Jul. 2006.

D. Singer and H. Desineni "A General Mechanism for RTP Header Extensions" Jul. 2008.

ISO/IEC JTC 1/SC 29/WG 11 N19274 "Potential Improvement of OMAF" May 29, 2020.

Miska M. Hannuksela, Ye-Kui Wang and Ari Hourunranta "An Overview of the OMAF Standard for 360 Video" Data Compression Conference, Mar. 2019.

\* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|   FMT   |    PT=206     |           length              |
+-+-+-+-+-+-+-+-+-+-+-+-+-+-+-+-+-+-+-+-+-+-+-+-+-+-+-+-+-+-+-+-+
|                  SSRC of packet sender                        |
+-+-+-+-+-+-+-+-+-+-+-+-+-+-+-+-+-+-+-+-+-+-+-+-+-+-+-+-+-+-+-+-+
|                  SSRC of media source                         |
+-+-+-+-+-+-+-+-+-+-+-+-+-+-+-+-+-+-+-+-+-+-+-+-+-+-+-+-+-+-+-+-+
|       Viewport_Azimuth        |        Azimuth_Range          |
+-+-+-+-+-+-+-+-+-+-+-+-+-+-+-+-+-+-+-+-+-+-+-+-+-+-+-+-+-+-+-+-+
|Viewport_Elev. | Elev._Range   |        Viewport_Tilt          |
+-+-+-+-+-+-+-+-+-+-+-+-+-+-+-+-+-+-+-+-+-+-+-+-+-+-+-+-+-+-+-+-+
```

FIG. 4

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   ID   | len=5 | Azimuth (h)  |  Azimuth (l)  |   Tilt (h)    |
+-+-+-+-+-+-+-+-+-+-+-+-+-+-+-+-+-+-+-+-+-+-+-+-+-+-+-+-+-+-+-+-+
|   Tilt (l)    | Elevation(h)  | Elevation(l)  |  zero padding |
+-+-+-+-+-+-+-+-+-+-+-+-+-+-+-+-+-+-+-+-+-+-+-+-+-+-+-+-+-+-+-+-+
```

FIG. 5

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    ID       |    len=208    |F|N_Regions=n|     QR    |   TT  |
+-+-+-+-+-+-+-+-+-+-+-+-+-+-+-+-+-+-+-+-+-+-+-+-+-+-+-+-+-+-+-+-+
|                     Projected_Region_Width                    |
+-+-+-+-+-+-+-+-+-+-+-+-+-+-+-+-+-+-+-+-+-+-+-+-+-+-+-+-+-+-+-+-+
|                     Projected_Region_Height                   |
+-+-+-+-+-+-+-+-+-+-+-+-+-+-+-+-+-+-+-+-+-+-+-+-+-+-+-+-+-+-+-+-+
|                     Projected_Region_Top                      |
+-+-+-+-+-+-+-+-+-+-+-+-+-+-+-+-+-+-+-+-+-+-+-+-+-+-+-+-+-+-+-+-+
|                     Projected_Region_Left                     |
+-+-+-+-+-+-+-+-+-+-+-+-+-+-+-+-+-+-+-+-+-+-+-+-+-+-+-+-+-+-+-+-+
|      Packed_Region_Width      |     Packed_Region_Height      |
+-+-+-+-+-+-+-+-+-+-+-+-+-+-+-+-+-+-+-+-+-+-+-+-+-+-+-+-+-+-+-+-+
|       Packed_Region_Top       |      Packed_Region_Left       |
+-+-+-+-+-+-+-+-+-+-+-+-+-+-+-+-+-+-+-+-+-+-+-+-+-+-+-+-+-+-+-+-+
```

FIG. 9

VIEWPORT DEPENDENT DELIVERY METHODS FOR OMNIDIRECTIONAL CONVERSATIONAL VIDEO

BACKGROUND

Technical Field

The example and non-limiting embodiments relate generally to transmission of video content and, more particularly, to use of omnidirectional or 360-degree video in conversational telepresence and conferencing scenarios, including point-to-point and multiparty conferencing.

Brief Description of Prior Developments

It is known to use 3GPP multimedia telephony service for IMS (MTSI) standards for session negotiation and media delivery for limited field of view (FOV) or 2D Rectilinear content.

SUMMARY

The following summary is merely intended to be exemplary. The summary is not intended to limit the scope of the claims.

In accordance with one aspect, a method comprising: receiving an omnidirectional video; determining a viewport of a user equipment; determining a delivery mode; determining a region of the omnidirectional video based, at least partially, on the determined viewport and the determined delivery mode; encoding the determined region; packetizing the encoded region; and transmitting the packetized region to the user equipment based, at least partially, on the determined delivery mode.

In accordance with one aspect, an apparatus comprising: at least one processor; and at least one non-transitory memory and computer program code, wherein the at least one memory and the computer program code are configured to, with the at least one processor, cause the apparatus to: receive an omnidirectional video; determine a viewport of a user equipment; determine a delivery mode; determine a region of the omnidirectional video based, at least partially, on the determined viewport and the determined delivery mode; encode the determined region; packetize the encoded region; and transmit the packetized region to the user equipment based, at least partially, on the determined delivery mode.

In accordance with one aspect, an apparatus comprising means for performing: receiving an omnidirectional video; determining a viewport of a user equipment; determining a delivery mode; determining a region of the omnidirectional video based, at least partially, on the determined viewport and the determined delivery mode; encoding the determined region; packetizing the encoded region; and transmitting the packetized region to the user equipment based, at least partially, on the determined delivery mode.

In accordance with one aspect, a non-transitory computer-readable medium comprising program instructions stored thereon which, when executed with at least one processor, cause the at least one processor to: receive an omnidirectional video; determine a viewport of a user equipment; determine a delivery mode; determine a region of the omnidirectional video based, at least partially, on the determined viewport and the determined delivery mode; encode the determined region; packetize the encoded region; and transmit the packetized region to the user equipment based, at least partially, on the determined delivery mode.

In accordance with one aspect, a method comprising: receiving an omnidirectional video; generating a first version of the omnidirectional video with a first resolution; generating a second version of the omnidirectional video with a second resolution, wherein the first version has a higher quality than the second version; receiving viewport information from a user equipment, where the viewport information comprises, at least, a size of the viewport and an orientation of the viewport; projecting a picture of the first version of the omnidirectional video; determining a region of the projected picture that corresponds to the received viewport information; rotating the projected picture to reorient the determined region of the projected picture to a center of the projected picture; encoding information, where the information comprises: a packed picture comprising: the region of the rotated projected picture of the first version of the omnidirectional video, and the second version of the omnidirectional video, an indication of rotation information corresponding to the rotating of the projected picture of the first version of the omnidirectional video, and packing information corresponding to the second version of the omnidirectional video; packetizing the encoded information; and transmitting, to the user equipment, the packetized information.

In accordance with one aspect, an apparatus comprising: at least one processor; and at least one non-transitory memory and computer program code, wherein the at least one memory and the computer program code are configured to, with the at least one processor, cause the apparatus to: receive an omnidirectional video; generate a first version of the omnidirectional video with a first resolution; generate a second version of the omnidirectional video with a second resolution, wherein the first version has a higher quality than the second version; receive viewport information from a user equipment, where the viewport information comprises, at least, a size of the viewport and an orientation of the viewport; project a picture of the first version of the omnidirectional video; determine a region of the projected picture that corresponds to the received viewport information; rotate the projected picture to reorient the determined region of the projected picture to a center of the projected picture; encode information, where the information comprises: a packed picture comprising: the region of the rotated projected picture of the first version of the omnidirectional video, and the second version of the omnidirectional video, an indication of rotation information corresponding to the rotating of the projected picture of the first version of the omnidirectional video, and packing information corresponding to the second version of the omnidirectional video; packetize the encoded information; and transmit, to the user equipment, the packetized information.

In accordance with one aspect, an apparatus comprising means for performing: receiving an omnidirectional video; generating a first version of the omnidirectional video with a first resolution; generating a second version of the omnidirectional video with a second resolution, wherein the first version has a higher quality than the second version; receiving viewport information from a user equipment, where the viewport information comprises, at least, a size of the viewport and an orientation of the viewport; projecting a picture of the first version of the omnidirectional video; determining a region of the projected picture that corresponds to the received viewport information; rotating the projected picture to reorient the determined region of the projected picture to a center of the projected picture; encoding information, where the information comprises: a packed picture comprising: the region of the rotated projected picture of the first version of the omnidirectional video, and the second version of the omnidirectional video, an indication of rotation information corresponding to the rotating of the projected picture of the first version of the omnidirectional video, and packing information corresponding to the second version of the omnidirectional video; packetizing the encoded information; and transmitting, to the user equipment, the packetized information.

In accordance with one aspect, a non-transitory computer-readable medium comprising program instructions stored thereon which, when executed with at least one processor, cause the at least one processor to: receive an omnidirectional video; generate a first version of the omnidirectional video with a first resolution; generate a second version of the omnidirectional video with a second resolution, wherein the first version has a higher quality than the second version; receive viewport information from a user equipment, where the viewport information comprises, at least, a size of the viewport and an orientation of the viewport; project a picture of the first version of the omnidirectional video; determine a region of the projected picture that corresponds to the received viewport information; rotate the projected picture to reorient the determined region of the projected picture to a center of the projected picture; encode information, where the information comprises: a packed picture comprising: the region of the rotated projected picture of the first version of the omnidirectional video, and the second version of the omnidirectional video, an indication of rotation information corresponding to the rotating of the projected picture of the first version of the omnidirectional video, and packing information corresponding to the second version of the omnidirectional video; packetize the encoded information; and transmit, to the user equipment, the packetized information.

In accordance with one aspect, a method comprising: receiving, with a media control unit, an omnidirectional video; receiving, with the media control unit, respective parameters from a plurality of user equipments, wherein the plurality of parameters comprise at least viewport information; generating, with the media control unit, at least two tiled videos based on the received omnidirectional video, wherein a first of the at least two tiled videos comprises a higher quality than a second of the at least two tiled videos, or the first of the at least two tiled videos comprises a higher resolution than the second of the at least two tiled videos; extracting, with the media control unit, a respective first bit stream from the first tiled video based on the respective viewport information from the plurality of user equipments; extracting, with the media control unit, a respective second bit stream from the second tiled video for the plurality of user equipments; merging, with the media control unit, a corresponding first bit stream and a corresponding second bit stream to form a respective merged bit stream for the plurality of user equipments; encoding, with the media control unit, the plurality of merged bit streams; and transmitting, to respective ones of the plurality of user equipments, an encoded merged bit stream of the plurality of encoded merged bit streams corresponding to the respective parameters of the respective ones of the plurality of user equipments.

In accordance with one aspect, an apparatus comprising: at least one processor; and at least one non-transitory memory and computer program code, wherein the at least one memory and the computer program code are configured to, with the at least one processor, cause the apparatus to: receive an omnidirectional video; receive respective parameters from a plurality of user equipments, wherein the plurality of parameters comprise at least viewport information; generate at least two tiled videos based on the received omnidirectional video, wherein a first of the at least two tiled videos comprises a higher quality than a second of the at least two tiled videos, or the first of the at least two tiled videos comprises a higher resolution than the second of the at least two tiled videos; extract a respective first bit stream from the first tiled video based on the respective viewport information from the plurality of user equipments; extract a respective second bit stream from the second tiled video for the plurality of user equipments; merge a corresponding first bit stream and a corresponding second bit stream to form a respective merged bit stream for the plurality of user equipments; encode the plurality of merged bit streams; and transmit, to respective ones of the plurality of user equipments, an encoded merged bit stream of the plurality of encoded merged bit streams corresponding to the respective parameters of the respective ones of the plurality of user equipments.

In accordance with one aspect, an apparatus comprising means for performing: receiving an omnidirectional video; receiving respective parameters from a plurality of user equipments, wherein the plurality of parameters comprise at least viewport information; generating at least two tiled videos based on the received omnidirectional video, wherein a first of the at least two tiled videos comprises a higher quality than a second of the at least two tiled videos, or the first of the at least two tiled videos comprises a higher resolution than the second of the at least two tiled videos; extracting a respective first bit stream from the first tiled video based on the respective viewport information from the plurality of user equipments; extracting a respective second bit stream from the second tiled video for the plurality of user equipments; merging a corresponding first bit stream and a corresponding second bit stream to form a respective merged bit stream for the plurality of user equipments; encoding the plurality of merged bit streams; and transmitting, to respective ones of the plurality of user equipments, an encoded merged bit stream of the plurality of encoded merged bit streams corresponding to the respective parameters of the respective ones of the plurality of user equipments.

In accordance with one aspect, a non-transitory computer-readable medium comprising program instructions stored thereon which, when executed with at least one processor, cause the at least one processor to: receive an omnidirectional video; receive respective parameters from a plurality of user equipments, wherein the plurality of parameters comprise at least viewport information; generate at least two tiled videos based on the received omnidirectional video, wherein a first of the at least two tiled videos comprises a higher quality than a second of the at least two tiled videos, or the first of the at least two tiled videos comprises a higher resolution than the second of the at least two tiled videos; extract a respective first bit stream from the first tiled video based on the respective viewport information from the plurality of user equipments; extract a respective second bit stream from the second tiled video for the plurality of user equipments; merge a corresponding first bit stream and a corresponding second bit stream to form a respective merged bit stream for the plurality of user equipments; encode the plurality of merged bit streams; and transmit, to respective ones of the plurality of user equipments, an encoded merged bit stream of the plurality of encoded merged bit streams corresponding to the respective parameters of the respective ones of the plurality of user equipments.

In accordance with one aspect, a method comprising: receiving an omnidirectional video; receiving, from at least one user equipment, viewport information; determining a region of the omnidirectional video based on the viewport information; generating a video stream comprising content corresponding to the determined region and other content corresponding to other regions of the omnidirectional video, wherein the content comprises a higher quality than the other content; and transmitting the video stream to the at least one user equipment.

In accordance with one aspect, an apparatus comprising: at least one processor; and at least one non-transitory memory and computer program code, wherein the at least one memory and the computer program code are configured to, with the at least one processor, cause the apparatus to: receive an omnidirectional video; receive from at least one user equipment, viewport information; determine a region of the omnidirectional video based on the viewport information; generate a video stream comprising content corresponding to the determined region and other content corresponding to other regions of the omnidirectional video, wherein the content comprises a higher quality than the other content; and transmit the video stream to the at least one user equipment.

In accordance with one aspect, an apparatus comprising means for performing: receiving an omnidirectional video; receiving, from at least one user equipment, viewport information; determining a region of the omnidirectional video based on the viewport information; generating a video stream comprising content corresponding to the determined region and other content corresponding to other regions of the omnidirectional video, wherein the content comprises a higher quality than the other content; and transmitting the video stream to the at least one user equipment.

In accordance with one aspect, a non-transitory computer-readable medium comprising program instructions stored thereon which, when executed with at least one processor, cause the at least one processor to: receive an omnidirectional video; receive from at least one user equipment, viewport information; determine a region of the omnidirectional video based on the viewport information; generate a video stream comprising content corresponding to the determined region and other content corresponding to other regions of the omnidirectional video, wherein the content comprises a higher quality than the other content; and transmit the video stream to the at least one user equipment.

BRIEF DESCRIPTION OF THE DRAWINGS

The foregoing aspects and other features are explained in the following description, taken in connection with the accompanying drawings, wherein:

FIG. 4 is a diagram illustrating features as described herein;

FIG. 5 is a diagram illustrating features as described herein;

FIG. 9 is a diagram illustrating features as described herein;

DETAILED DESCRIPTION OF EMBODIMENTS

Figure 1:
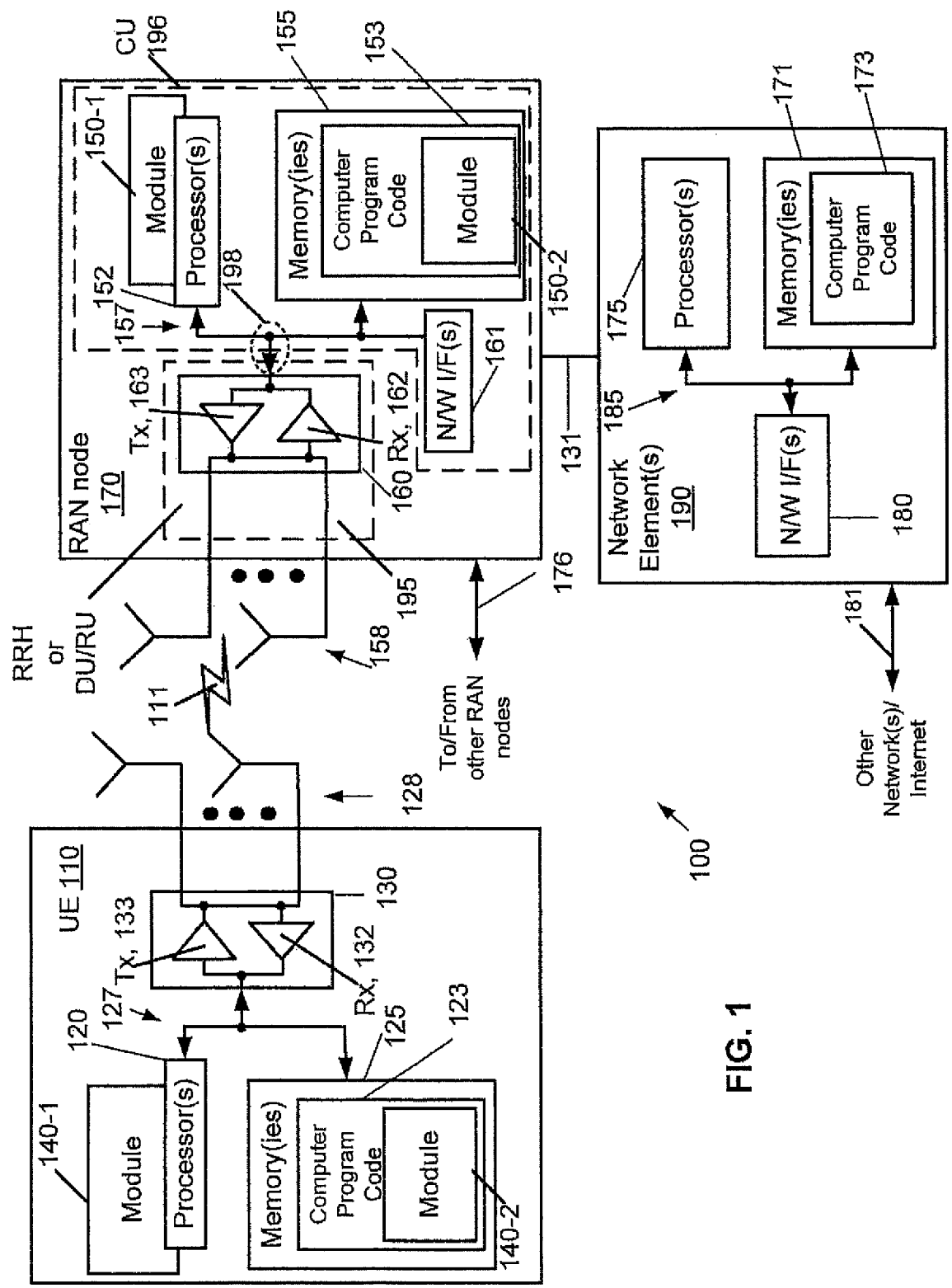
FIG. 1 is a block diagram of one possible and non-limiting exemplary system in which the exemplary embodiments may be practiced.

The following abbreviations that may be found in the specification and/or the drawing figures are defined as follows:

2D two dimensional
3GPP third generation partnership project
5G fifth generation
5GC 5G core network
AMF access and mobility management function
AVC advanced video coding
BWP bandwidth part
cfov capture field of view
CM coordinate mapping
CU central unit
CSI-RS channel state information reference signal
DCI downlink control information
DL downlink
DU distributed unit
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
ERP equirectangular projection
E-UTRA evolved universal terrestrial radio access, i.e., the LTE radio access technology
FB feedback
FIR full intra request
FOV field of view
gNB (or gNodeB) base station for 5G/NR, i.e., a node providing NR user plane and control plane protocol terminations towards the UE, and connected via the NG interface to the 5GC
HEVC high-efficiency video coding
HMD head mounted display
HQ high quality
IETF internet engineering task force
I/F interface
IMS IP multimedia subsystem
IP internet protocol
IRAP intra random access picture
L1 layer 1
LQ low quality
LTE long term evolution MAC medium access control
MCTS motion-constrained tile set
MCU media control unit
MME mobility management entity
MPEG Moving Picture Experts Group
MRF media resource function
MTHQD Motion-to-High-Quality Delay
MTSI multimedia telephony service for IMS
ng or NG new generation
ng-eNB or NG-eNB new generation eNB
NR new radio
N/W or NW network
NZP non-zero power
OMAF omnidirectional media format
OMAFv1 OMAF version 1
OMAFv2 OMAF version 2
PDCP packet data convergence protocol
PDCCH physical downlink control channel
PDSCH physical downlink shared channel
pfov preferred field of view
PHES payload header extension structure
PHY physical layer
PPM packed-picture mapping or projected picture mapping
PUSCH physical uplink shared channel
QCL quasi co-location
QOE quality of experience
QoS quality of service
qp quantization parameter
RAN radio access network
RF radio frequency
RFC request for comments
RLC radio link control
ROI region of interest
RRH remote radio head
RRC radio resource control
RS reference signal
RTCP real-time transport control protocol
RTP real-time transport protocol
RTT round-trip time
RU radio unit
RWMQ region-wise mixed quality
RWMR region-wise mixed resolution
Rx receiver
SCTP stream control transmission protocol
SDAP service data adaptation protocol
SDP session description protocol
SEI supplemental enhancement information
SGW serving gateway
SIP session initiation protocol
SL sphere-locked
SLIV start and length indicator
SMF session management function
SRS sounding reference signal
TDRA time domain resource assignment
TS technical specification
Tx transmitter
UE user equipment (e.g., a wireless, typically mobile device)
UDP user datagram protocol
UL uplink
UPF user plane function
VDD viewport-dependent delivery
VDP viewport-dependent processing
VDP-SL viewport-dependent processing with sphere-locked rendering
VDP-VL viewport-dependent processing with viewport-locked rendering
VL viewport-locked
VVC versatile video coding Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. While not illustrated in FIG. 1, the UE 110 may additionally include or be connected with means for capturing video content or rendering video content. Means for capturing video content may comprise, for example, a 360 camera or an omnidirectional camera. Means for rendering video content may comprise, for example, a display, screen, monitor, projecting device, or head mounted display (HMD). A device for rendering video content may be used with information indicating head motion of a user, which may be provided by a head-motion sensor that is part of or separate from the device. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360-degree area so that the single base station's coverage area covers an approximate oval or circle. Furthermore, each cell can correspond to a single carrier and a base station may use multiple carriers. So, if there are three 120-degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more networks (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor-based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general-purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Features as described herein generally relate to use cases of conversational telepresence and conferencing with omnidirectional or 360-degree video. More specifically, example embodiments may relate to aspects of viewport dependent delivery of omnidirectional or 360-degree video. In the following description, the term "omnidirectional" may refer to media content that may have a greater spatial extent than a field-of-view of a device rendering the content. Omnidirectional content may, for example, cover substantially 360 degrees in the horizontal dimension and substantially 180 degrees in the vertical dimension, but omnidirectional may also refer to content covering less than a 360 degree view in the horizontal direction and/or a 180 degree view in the vertical direction, but covering a greater view than the field of view of a rendering device in either or both the horizontal and vertical directions.

In the following description, it should be noted that the words "omnidirectional" and "360-degree" may be used interchangeably. Use of one or the other of these words should not be interpreted as limiting the disclosure.

An omnidirectional image may be represented by a sphere that has been mapped to a two-dimensional image plane using equirectangular projection (ERP). In this case, the horizontal coordinate may be considered equivalent to a longitude, and the vertical coordinate may be considered equivalent to a latitude, with no transformation or scaling applied. An ERP image may be formed from a set of input images, such as fisheye images of a camera array or a camera device with multiple lenses and sensors, which are stitched together into a spherical image. The spherical image may further be projected into a cylindrical image (i.e. an image shaped like a cylinder without the top and bottom faces). The cylinder may then be unfolded to form a two-dimensional projected frame. In practice, one or more of the presented steps may be merged; for example, the input images may be directly projected onto a cylinder without an intermediate projection onto a sphere. The projection structure for equirectangular projection may be considered to be a cylinder that comprises a single surface.

In general, omnidirectional content may be mapped onto different types of solid geometrical structures, such as polyhedron (i.e. a three-dimensional solid object containing flat polygonal faces, straight edges, and sharp corners or vertices, e.g., a cube or a pyramid), cylinder (e.g. by projecting a spherical image onto the cylinder, as described above with the equirectangular projection), cylinder (e.g. directly without projecting onto a sphere first), cone, etc. After mapping of the omnidirectional content onto a geometrical structure, the mapped image may then be unwrapped to a two-dimensional image plane. This process may enable presentation of omnidirectional content with a 2D rendering device.

A "viewport" may be defined as a region of an omnidirectional image or video suitable for display and viewing by the user. A current viewport (which may be simply referred to as a viewport) may be defined as the part of the spherical video that is currently displayed and hence is viewable by the user(s). At any point in time, a video rendered by an application on, for example, a head-mounted display (HMD) may comprise rendering a portion of the 360-degrees video, which is referred to as a viewport.

The term "viewport-dependent video" may refer to video content where the region(s) that lie within the viewport are treated differently than the rest of the omnidirectional content (e.g. by encoding the viewport at a higher quality). Such a content may be provided by the sender to a receiver device based on the viewport orientation and viewport size or field of view of the receiver device.

In an example use case, there may be a 360-degree conference with multiple receivers. A media resource function (MRF) or media control unit (MCU), which may be part of a wireless network 100, may act as a middleman for media processing/delivery. The multiple receivers may be considered an extension of multimedia telephony service for IMS (MTSI) user equipment (UE). In another example use case, there may be a conversational audio-visual session between two MTSI UEs, where one device is capturing omnidirectional content and the other person is consuming the content with a 2D display or a head-mounted display (HMD).

In the following description, it should be noted that the phrases "MCU" and "MRF" may be used interchangeably. Use of one or the other of these words should not be interpreted as limiting the disclosure. It should also be noted that where an MCU/MRF is described as performing an action, a sender UE may appropriately perform the action instead, and vice versa.

The MTSI standard defines the session negotiation and media delivery for limited field of view (FOV) or 2D Rectilinear content. However, in the MTSI standard, there is no support for omnidirectional content representation and efficient delivery. The omnidirectional media format (OMAF), specified in a Moving Picture Experts Group (MPEG) standard, supports omnidirectional content with viewport dependent delivery, but does not support conversational content creation, consumption, and delivery. OMAF version 1 (OMAFv1) and OMAF version 2 (OMAFv2) specifications define methods for viewport dependent delivery, but these methods are not suitable for use in conversational scenarios. Clause 6 and 9 of the 3GPP Permanent document S4-200840 are related to viewport dependent delivery.

Bandwidth may be wasted due to limited viewing of an omnidirectional video, as bandwidth may be used to transmit portions of the omnidirectional video which will ultimately not be viewed. This problem persists in the case of conversational video, where a user might not choose to view all available omnidirectional video during a communication session. The main difference between the conversational omnidirectional video and the streaming of omnidirectional video is low end-to-end latency. The effect of low-latency delivery may be to ensure that high quality video content delivered to a receiver UE corresponds to the viewport of the receiver UE in real-time, and may also be to ensure that the glass-to-glass latency (i.e. the difference between the time a video frame is captured by a camera at the sender and the time it is displayed on a display device of the receiver) is in, or close to, real-time. A permissible latency for delivery may be dependent on quality of experience (QOE) requirements, which may serve to ensure user comfort as well as facilitate conversation between the sender and receiver UE users. In an example embodiment, a method for performing low latency delivery of omnidirectional or 360-degree video in a conversational scenario may be compatible with the protocol stack defined in MTSI. In an example embodiment, omnidirectional video may be optimized per receiver UE. This may be suitable for point-to-point video telephony. In an example embodiment, a method of the MRF/MCU for delivery of omnidirectional or 360-degree video may be scalable to serve multiple omnidirectional video receiver UEs. This may be suitable for multiparty video conferencing. In an example embodiment, rate adaptation methods may be implemented by the MFR/MCU and/or receiver UEs. This may leverage different network QoS conditions.

The MTSI protocol stack consists of real-time transport protocol/real-time transport control protocol (RTP/RTCP) media transport and session initiation protocol/session description protocol (SIP/SDP) signaling for session negotiation. Example embodiments herein described may relate to or modify these features of the MTSI protocol stack.

Real-time Transport Protocol (RTP) is widely used for real-time transport of timed media such as audio and video. RTP may operate on top of the User Datagram Protocol (UDP), which in turn may operate on top of the Internet Protocol (IP). RTP is specified in Internet Engineering Task Force (IETF) Request for Comments (RFC) 3550, available from www.ietf.org/rfc/rfc3550.txt. In RTP transport, media data is encapsulated into RTP packets. Typically, each media type or media coding format has a dedicated RTP payload format.

In an example embodiment, only a part of the omnidirectional video (i.e. a part related to a viewport) may be delivered to the receiver UE. Since only a part of the omnidirectional video is delivered, that part of the omnidirectional video may occupy the available transmission bandwidth and thus may have higher picture quality compared to the case where the entire omnidirectional video is transmitted. It may therefore be stated that the part of the omnidirectional video may be transmitted in high quality (HQ). This part of the omnidirectional video may be extracted from a re-projected or live (e.g., not projected) stitched picture, while maintaining constant resolution of the picture to be encoded. This may be achieved by first performing viewport selection based on the head orientation and/or viewport size of the receiver UE to determine the relevant part of a projected picture (e.g., equirectangular projection (ERP)). In response to this viewport selection, a sender UE or MRF/MCU may rotate the selected viewport to the center of the projected picture, which may ensure consistent resolution of the selected viewport to be encoded.

An encoded HQ viewport may be delivered to a receiver UE such that it is locked to the center of the user's viewport, or, in other words, locked with the user's viewing orientation. This encoded HQ viewport may therefore be considered viewport-locked content. This method might not require the sending of the rotation information (for rotating the selected viewport to the center of the projected picture, as described above) from the sender UE to the receiver UE and, therefore, the receiver UE may be unaware of how to re-map the received viewport to the original orientation during the capture of the omnidirectional content. This method of omnidirectional video delivery may also be used for optimized viewport sharing to the follower UEs.

The encoded HQ viewport may also be delivered as a sphere-locked HQ viewport. This may require signaling the rotation information from the sender UE or MRF/MCU in order for the receiver UE to reverse the rotation (as described above) of the received HQ viewport, which may allow the receiver UE to re-map the received viewport to the original orientation (during capture of the omnidirectional content). This may be implemented by reusing the sphere rotation supplemental enhancement information (SEI) message (as specified in ITU-T H.264, H.265, or H.274 standard or in a similar way), or by extending the RTP payload header.

Figure 2:
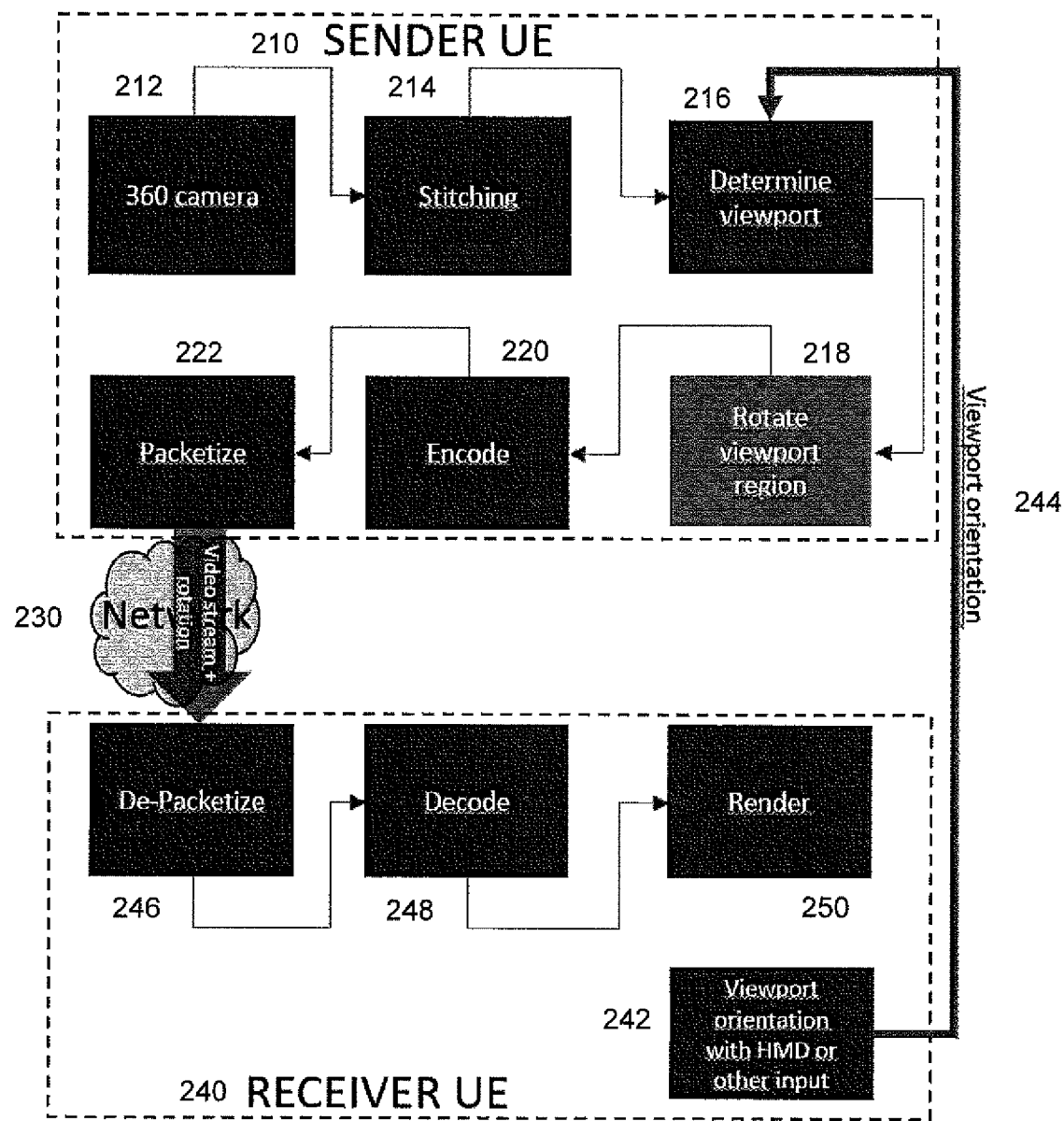
FIG. 2 is a diagram illustrating features as described herein.

Referring now to FIG. 2, illustrated is a high-quality viewport only solution. Illustrated is a sender UE 210 and a receiver UE 240 communicating over a network 230/244. It should be understood that while FIG. 2 illustrates steps taking place in the sender UE 210, some or all of the steps may occur in an MRF/MCU. A 360-degree camera of, or in communication with, the sender UE 210 may capture an image from two or more sensors, 212. The images captured with the two or more sensors may (optionally) be stitched together, 214, for example if the native camera API doesn't provide a stitched output to the sender UE 210. As a result, an omnidirectional video may be produced. This omnidirectional video may be of high quality.

Viewport selection/determination 216 may be implemented in the sender UE 210 application based on the viewport size and viewport orientation 242 signaled by the receiver UE 240 via the network 244. For example, the viewport selection may be based on the session description protocol (SDP) parameter for viewport signaled by the receiver UE 240 to the sender UE 210. This viewport orientation may be described as either field of view information or as a region in the projected picture (e.g., equirectangular projection (ERP)). If viewport orientation information is independent of projection format (e.g., ERP), it may be applied to different formats. Alternatively, if viewport orientation information is specific to the projection format, it may map exactly to the projected picture. Alternatively, the instantaneous value of viewport orientation information, 242, may be obtained as feedback over real-time transport control protocol (RTCP), stream control transmission protocol (SCTP) or another protocol, 244.

Figure 3:
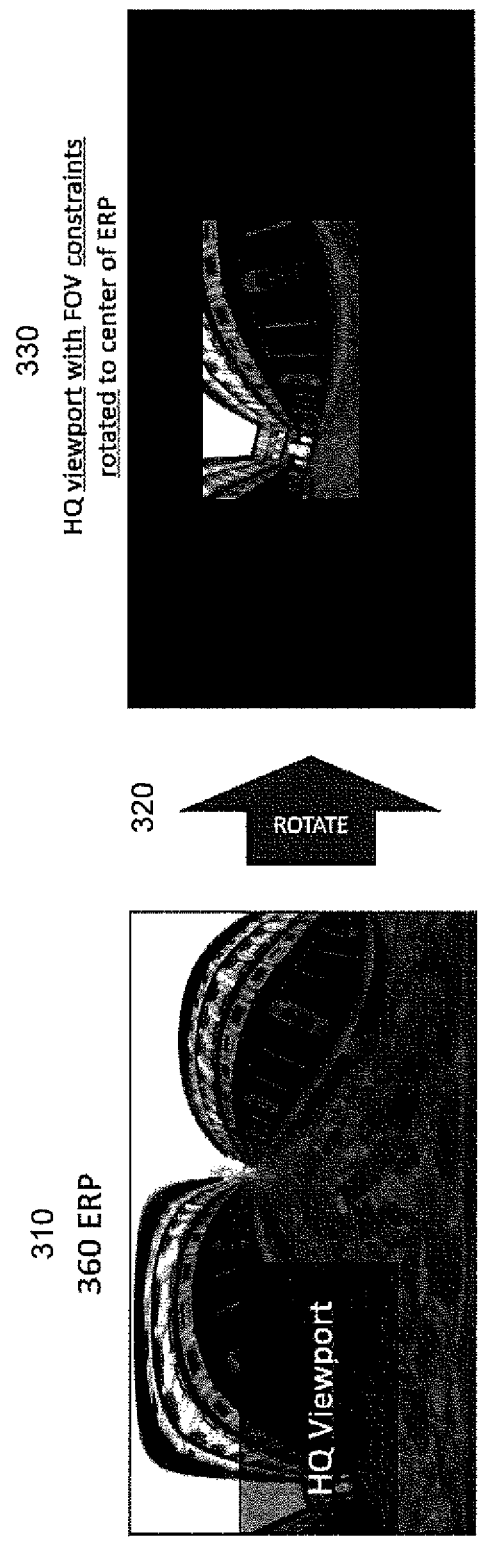
FIG. 3 is a diagram illustrating features as described herein.

Based on the determined viewport 216, the sender UE 210 may rotate the omnidirectional video so that the determined viewport region is reoriented to the center of the projected picture of the omnidirectional video, 218. This may ensure consistent resolution for the viewport-dependent encoded picture based on the projected picture. Referring now to FIG. 3, illustrated is a viewport-only delivery implementation. A 360-degree ERP of the omnidirectional video 310 shows that, in this example, the viewport signaled by the receiver UE is not located at the center of the projected picture. Rotation 320 of the projected picture may result in a HQ viewport with field of view constraints that is rotated to the center of the ERP, 330.

Referring now to FIG. 2, at 220, a high-quality portion of the omnidirectional video corresponding to the determined viewport may be encoded for transmission to the receiver UE 240. Encoding may be performed by a single encoder with output always at the same resolution for a given viewport size, independent of the viewport orientation with respect to the omnidirectional content. At 222, the encoded portion may be packetized for transmission to the receiver UE 240. The packetized data may be transmitted to the receiver UE 240 in a video stream over the network 230. A rotation may additionally be transmitted with the video stream 230. A rotation may, for example, be represented by three rotation angles, each specifying the rotation around a coordinate axis of a three-dimensional coordinate system.

Optionally, only a high-quality viewport may be delivered via the network 230, reflecting the user's viewing orientation, also referred to as viewport orientation. The user's viewport dependent video may be delivered as either viewport-locked delivery or sphere-locked delivery.

The delivered video stream may be depacketized 246 at receiver UE 240. The depacketized data may be decoded at 248. The decoded data may be rendered at 250.

In the case of viewport-locked delivery mode, the sender UE 210 may deliver the HQ viewport, and the receiver UE may position the received content at the center of the viewport orientation for rendering 250. Consequently, the player/renderer of the receiver UE 240 might not perform any viewport change/update due to head motion during the rendering, as the received video is responsive to (i.e. updated according to) the viewport orientation 242 signaled to the sender UE 210 at 244, and subsequent update of the viewport content by the sender UE 210 (e.g. at 216). Therefore, the latency perceived by a viewer of the content rendered (250) with the receiver UE 240 for even small head motion may include at least one full round-trip time (RTT) period. This may require that frequent viewport orientation update (s) be signaled to the sender UE 210 as, for example, real-time transport control protocol (RTCP) feedback information. The feedback for responding to the head-motion or change in viewport orientation, may be delivered over a network with an RTT value which is less than the frame rate in order to minimize perceived latency. This mode of delivery of omnidirectional video may also be used for optimized viewport sharing to "follower UEs," as described in ITT4RT Permanent Document v. 0.7.1, S4-200840, Jun. 3, 2020. https://www.3gpp.org/ftp/tsg_sa/WG4_CODEC/TSGS4_109-e/Docs/S4-200840.zip, which is hereby incorporated by reference in its entirety. For example, this mode of delivery of omnidirectional video may be useful for online gaming scenarios with centralized servers and ultra-low latency requirements.

The size of the viewport may be communicated at session start-up using session signaling, e.g., session description protocol (SDP) signaling. The viewport information feedback from the receiver UE 240 to the sender UE 210 may comprise the fields Viewport_Azimuth, Viewport_Elevation, Viewport_Tilt, Azimuth_Range and Elevation_Range, as defined in ITT4RT Permanent Document v. 0.7.1, S4-200840, Jun. 3, 2020. https://www.3gpp.org/ftp/tsg_sa/WG4_CODEC/TSGS4_109-e/Docs/S4-200840.zip. Alternatively, since the Azimuth_Range and Elevation_Range may correspond to the size of the viewport, they might not need to be signaled in every feedback report; a zoom_factor may be signaled instead, which may serve to reduce the size of the feedback packet. The zoom_factor may define the level of magnification of the viewport content. For example, a zoom factor of 1.0 may indicate no zoom. Other suitable units may also be used. In other words, an initial feedback packet may include Azimuth_Range and Elevation_Range but not a zoom_factor, while a feedback packet after an initial feedback packet might not include Azimuth_Range and Elevation_Range but may include a zoom_factor.

Referring now to FIG. 4, illustrated is a possible format for the RTCP feedback message. The RTCP feedback message is discussed in IETF RFC 4585: "Extended RTP Profile for Real-time Transport Control Protocol (RTCP)-Based Feedback (RTP/AVPF)", J. Ott, S. Wenger, N. Sato, C. Burmeister, and J. Rey, which is hereby incorporated by reference in its entirety. The Viewport_Azimuth may specify the azimuth of the center point of the sphere region corresponding to the desired/selected/determined viewport. The Azimuth_Range may specify the range of the azimuth passing through the center of the viewport, as specified by Viewport_Azimuth and Viewport_Elevation. The Viewport_Elevation may specify the elevation of the center point of the sphere region corresponding to the desired/selected/determined viewport. The Elevation_Range may specify the range of the viewport elevation, passing through the center of the viewport, as specified by Viewport_Azimuth and Viewport_Elevation. The Viewport_Tilt may specify the tilt angle of the sphere region corresponding to the desired/selected/determined viewport.

In the case of sphere-locked delivery mode, "margins" for the viewport may be used. Viewport margins are extra borders added to the user's viewport in order to build a spatial high-quality "safety area" around the user's viewport. One advantage of using margins is that, upon head motion, the Motion-To-High-Quality Delay (MTHQD) may be greatly reduced. A second advantage is that the percentage of low-quality viewport seen by the user may also be reduced, resulting in an overall increase in QoE. In order to use viewport margins, it may be necessary to map the delivered content to the global coordinates (real capture position) of the omnidirectional stitched video. This may cause the delivered high-quality viewport to remain attached to the omnidirectional video sphere, which may mean that the high-quality viewport does not move based on a change in viewport orientation, which may be caused by a user's head motion (e.g. when an HMD or other portable viewing device is used). Global coordinates of the high-quality viewport may be signaled from the sender UE 210 to the receiver UE 240. For example, a sphere rotation supplemental enhancement information (SEI) message (as specified in ITU-T H.264, H.265, or H.274 standard or in a similar way) that tells/indicates where, in the sphere, the particular frame corresponds to may be included in the video stream 230 (e.g. coordinates). The application of the sender UE 210 may insert these SEI in the video stream 230, or signal them as RTP header extension, or transmit them as part of a separate RTP stream.

The user associated with the receiver UE 240 may perform a viewport orientation change in order to utilize a viewport with a size that is greater than the user's field of view, i.e. a viewport including margins in addition to the user's FOV. The sphere-locked delivery mode of omnidirectional video may be performed without frequent viewport orientation change update(s) from the receiver UE 240 to the sender UE 210. A technical effect of the sphere-locked delivery mode may be greater tolerance for high latency in the network by allowing the use of viewport margins.

RTP header extensions are discussed in IETF RFC 5285 (2008): "A General Mechanism for RTP Header Extensions", D. Singer, H. Desineni, which is hereby incorporated by reference in its entirety. An RTP header extension for Coordinate Mapping (CM) based on RFC 5285 may comprise the global coordinates of the high-quality viewport. An example urn to signal CM in SDP may be:

a=extmap:5 urn:3gpp:coordinate-mapping where the value "5" in the example may be any value in the range 1-14. The one-byte header format is used in this example. The CM information may contain the center of the sent high-quality region (viewport and margin) with respect to the center of the global coordinates. Referring now to FIG. 5, illustrated is a possible format for the RTP header extension. The 4-bit ID may be the local identifier, as defined in RFC 5285, incorporated by reference above. The length field (indicated by "len") may have a value of 5 to indicate that 6 bytes follow. For each two-byte indication of the Azimuth, Elevation and Tilt parameters, the high byte (indicated by '(h)' above) may be followed by the low byte (indicated by '(1)' above), where the low byte may indicate the least significant bits. The Azimuth and Elevation may indicate the azimuth and elevation of the delivered HQ viewport/region's center with respect to global coordinates (0, 0), and the tilt may indicate the rotation of the HQ viewport/region.

RTP payload formats may specify an RTP payload header, which may contain metadata of the payload comprising compressed video data. The RTP payload header may have an extensible format, thus allowing for RTP payload header extensions. For example, the RTP payload format for High-Efficiency Video Coding, specified in IETF RFC 7798, specifies a payload header extension structure (PHES). In an example embodiment, an RTP payload header extension may carry sphere rotation metadata and/or delivered viewport FOV metadata, similar to what has been described above.

In an example embodiment, a delivery mode may be negotiated as a session negotiation parameter, to either indicate or negotiate the sphere-locked (SL) or viewport-locked (VL) viewport dependent delivery (VDD) model.

In an example embodiment, current permanent document S4-200840, incorporated by reference above, may be enhanced with VDD session negotiation capability. In an example embodiment, the following SDP attribute extension may be implemented:

3gpp_360video="a=3gpp_video:" [SP "VDP or VDP-SL or VDP-VL" SP "Stereo"]

where "VDP-SL" and "VDP-VL" are included as alternative viewport-dependent processing modes.

In another example embodiment, the following SDP attribute extension may be implemented:

3gpp_360video="a=3gpp_video:" [SP "VDP" SP "Stereo"]:[SP 'VL']

where "VL" is included as an alternative viewport-dependent processing mode.

In addition, an MTSI terminal supporting the 360-degree video feature, which supports use of viewport-dependent processing, may be extended to support viewport-dependent processing with sphere-locked rendering (VDP-SL) by including the VDP-SL parameter in the SDP offer and answer, for example as in the above example SDP attribute extension. Depending on the value indicated by the VDP parameter, the MTSI terminal may further support one or more of the following procedures:

1. the RTCP feedback (FB) message type (described in clause 9.2 of current permanent document S4-200840) may carry desired/selected/determined or requested viewport information during the RTP streaming of media (signaled from the MTSI receiver to the MTSI sender).

2. the RTCP feedback (FB) message type (described in clause 9.3 of current permanent document S4-200840) may carry desired/selected/determined ROI (arbitrary or pre-defined) information during the RTP streaming of media (signaled from the MTSI receiver to the MTSI sender).

3. the new RTP header extension type (described in clause 9.4 of current permanent document S4-200840) may carry actually transmitted viewport information during the RTP streaming of media (signaled from the MTSI sender to the MTSI receiver).

4. the new RTP header extension may carry the rotation information to obtain the global coordinates of the received HQ viewport content (which may subsume/include the margins).

An MTSI terminal supporting the 360-degree video feature and supporting use of viewport-dependent processing with viewport-locked rendering (VDP-VL) may include the VDP-VL parameter (as shown above) or the additional parameter "VL" (as shown above) in the SDP offer and answer. Depending on the value indicated by the VDP parameter, the MTSI terminal may further support one or more of the following procedures:

1. not performing any head rotation processing on the received content. This may comprise rendering the received content with its center aligned with the center of the receiver UE viewport.

2. the RTCP feedback (FB) message type (described in clause 9.2 of current permanent document S4-200840) may carry the user's viewport information during the RTP streaming of media (signaled from the MTSI receiver to the MTSI sender).

3. the receiver may render the received content to the center of the current receiver UE viewport and lock it to the viewport. Consequently, the two devices may agree on the high frequency signaling.

4. an additional, optional FB frequency parameter may be negotiated to ensure consistent quality experience.

In an example embodiment, a high-quality viewport based on the user's viewing orientation and a low-quality representation of the omnidirectional video may be delivered. The high-quality and low-quality portions may be packed in the same frame or picture. This example embodiment may be considered an extension of a sphere-locked HQ viewport delivery method. The high-quality viewport may be extracted and rotated to the desired part of the projected picture, and the low-quality sphere may be included in a predetermined region of the packed/projected frame/picture.

The receiver UE may signal to the sender UE or MRF/MCU, in a session description protocol (SDP) message, packed-picture mapping (or modified region-wise packing) information regarding the high-quality viewport as well as the low-quality omnidirectional video (i.e. entire sphere). The sender UE may indicate in the packed-picture mapping information which part is HQ viewport and which is low quality (LQ) background sphere. This information may be non-changing/static, dependent on the viewport orientation, because the omnidirectional video may always be rotated to the center.

Region-wise packing may be applied in the sender UE to map the projected picture onto a packed picture, where the packed picture is provided as input for video encoding. If the region-wise packing is not applied, the packed picture may be regarded as being identical to the projected picture, and this projected picture may be given as input for video encoding. In region-wise packing, regions of the projected picture are mapped onto a packed picture, which may comprise indicating the location, shape, and/or size of each region of the projected picture in the packed picture. The term "region-wise packing" may be defined as a process by which a projected picture is mapped to a packed picture. The term "packed picture" may be defined as a picture that results from region-wise packing of a projected picture.

Region-wise packing information may be encoded as metadata in or along the bitstream from the sender UE to the receiver UE. For example, the packing information may comprise a region-wise mapping from a pre-defined or indicated source format to the packed frame format, e.g. from a projected picture to a packed picture, as described earlier.

In rectangular region-wise packing, rectangles of the projected picture may be mapped to rectangles in the packed picture. In other words, the regions of the packed picture may be rectangular in shape. An example of rectangular region-wise packing metadata is described next: For each region, the metadata defines a rectangle in a projected picture, the respective rectangle in the packed picture, and an optional transformation of rotation by 90, 180, or 270 degrees and/or horizontal and/or vertical mirroring. Rectangles may, for example, be indicated by the locations of the top-left corner and/or the bottom-right corner. The mapping may comprise resampling. As the sizes of the respective rectangles may differ in the projected and packed pictures, the mechanism may infer region-wise resampling.

Additionally, the receiver UE may signal the high-quality viewport global coordinates to enable head-motion (or sphere-locked rendering), which may be delivered as described above.

Figure 6:
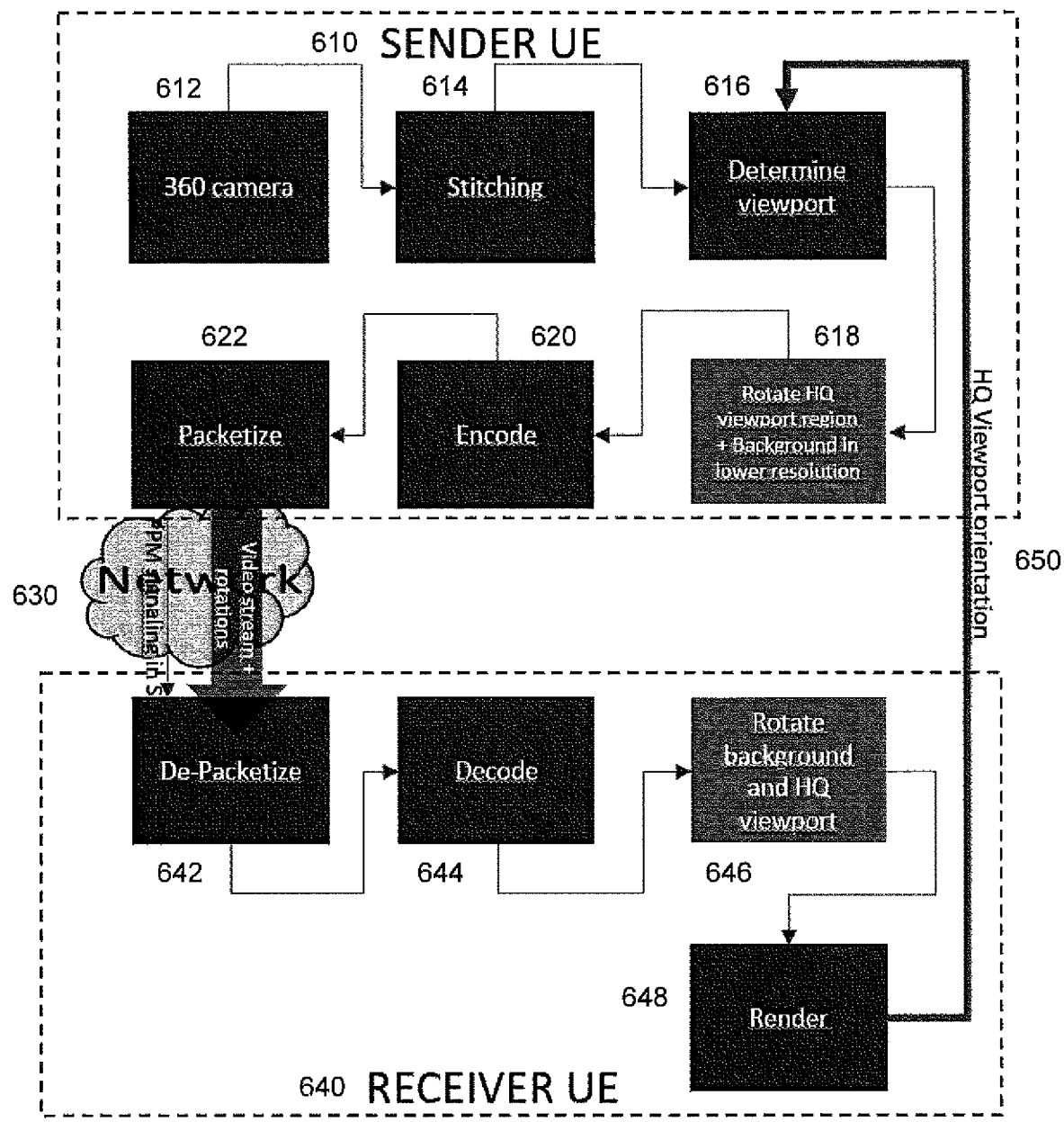
FIG. 6 is a diagram illustrating features as described herein.

A viewport orientation dependent HQ viewport and a viewport independent low-quality omnidirectional video packed in the same frame may result in utilizing region-wise packing in a manner which need not change for every change in viewport orientation. Referring now to FIG. 6, illustrated is delivery of high-quality viewport information and low-quality information for other orientations. Illustrated is a sender UE 610 and a receiver UE 640 communicating over a network 630/650. It should be understood that while FIG. 6 illustrates steps taking place in the sender UE 610, some or all of the steps may occur in an MRF/MCU. A 360-degree camera of, or in communication with, the sender UE 610 may capture an image from two or more sensors, 612. The images captured with the two or more sensors may (optionally) be stitched together, 614, if the native camera API doesn't provide a stitched output to the sender UE 610. As a result, an omnidirectional video may be produced. In other words, stitching may not occur if the native camera API provides a stitched output to the sender UE 610. This omnidirectional video may be of high quality.

Sender UE 610 may generate a low-quality version of the omnidirectional captured video and a high-quality version of the omnidirectional captured video, each with a different resolution. The sender UE 610 may determine the high-quality viewport region 616. Viewport size may be based on a viewport size obtained from the receiver UE 640 and the viewport orientation 650 may be obtained from, for example, a RTCP feedback message from receiver UE 640 to sender UE 610. Based on the HQ viewport orientation 650, the sender UE 610 may extract a high-quality viewport region of the omnidirectional video, rotate to the desired/selected/determined part of the projected picture of the omnidirectional video 618, and store the rotation information for HQ viewport. This process may be similar to the process described above with respect to 216/218 of FIG. 2. In addition, the background (i.e. a lower quality omnidirectional video/sphere outside the HQ viewport) may be included in the packed picture, and the packing information for LQ background may be stored, 618. This rotation and packing information may be indicated or determined based on the resolutions for the HQ viewport region and LQ 360-degree video during session negotiation. For example, this information may be indicated in an SDP message, which may indicate region-wise packing.

A packed-picture mapping approach (also referred to as modified region-wise packing, from omnidirectional media format (OMAF)) may indicate which part of the omnidirectional video is HQ viewport and which part is LQ background sphere. This may be static/non-changing dependent on the viewport orientation, which might always be rotated to the center. The media delivery 630 from sender UE 610 to receiver UE 640 may consist of rotation information for the HQ viewport region, which may be performed as described in the above embodiment.

Following is an example SDP session description. The cfov (capture field of view) may correspond to a captured field of view, and PPM may represent the "projected picture mapping" component in the 3gpp_360video attribute. Thus, cfov may be equal to the projected picture width and height. The PPM may be used together with the cfov and imageattr. In some embodiments, cfov may be replaced with pfov (preferred field of view).

```
/ *omni video of room A* /
a=rtpmap:100 H265/90000
a=3gpp_360video:100    cap:VDP/VDSL/VDVL;    sm=Mono;
cfov: [x=360, y=180]  PPM: [a1, b1, c1, a2, b2, c2]  proj:ERP    / *vd
delivery with limited sphere capture and ERP projection* /
a=fmtp:100 profile-id=1; level-id=93;
sprop-vps=QAEMAf / / AWAAAAMAgAAAAwAAAwBdLAUg;
sprop-sps=QgEBAWAAAAMAgAAAAwAAAwBdoAKAgC0WUuS0i9AHcIBB;
sprop-pps=RAHAcYDZIA==
a=imageattr:100 send [x=7680, y=4320] recv [x=1280, y=720]
```

Figure 7:
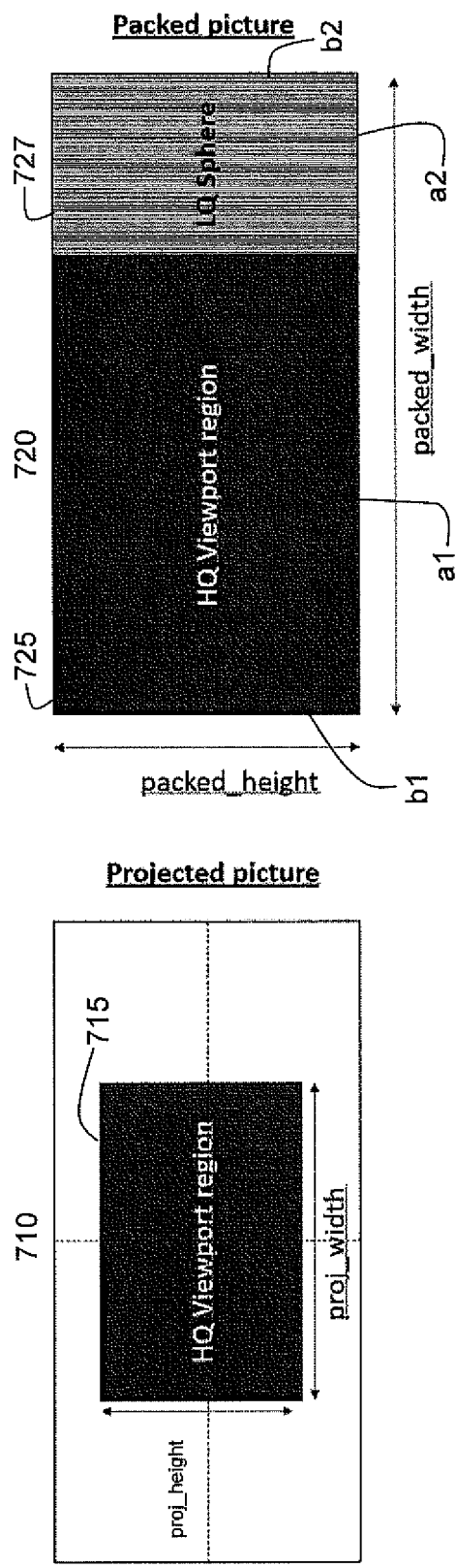
FIG. 7 is a diagram illustrating features as described herein.

In the above example, the entire cfov range, which is in this example different cfov, corresponds to the imageattr picture resolution. Consequently, the encoded packed picture width and height may be 7680 and 4320, respectively. Referring now to FIG. 7, illustrated is a packed projected picture description in SDP. In the projected picture 710, the HQ viewport region 715 has a proj_width and a proj_height. In the packed picture 720, the HQ viewport region 725 and the LQ sphere 727 together have a packed_width and a packed_height. The entire cfov range may correspond to the total packed-width and packed_height of the packed picture 720.

If PPM is indicated with six arguments PPM[a1, b1, c1, a2, b2, c2], HQ viewport packing and LQ sphere packing may be described as follows.

In HQ viewport packing, a1=packed picture_width of the HQ viewport region (equivalent to region-wise packing packed_reg_width) and b1=packed_picture_height of the HQ viewport region 725 (equivalent to region-wise packing packed_reg_height). The projected picture width and height may be obtained via the signaled viewport and margins. Consequently, projected_width of HQ viewport 715=viewport_width+Left-margin+Right-margin (equivalent to proj_reg_width in region-wise packing), and projected_height of HQ viewport 715=viewport_height+Top-margin+Bottom-margin (equivalent to proj_reg_height in region-wise packing). If cfov is present in the SDP session description, the projected_picture_width and projected_picture_height corresponding to the unpacking information in region-wise packing definition for HQ viewport region 715 may be the source ERP picture projected_width and projected_height, which may correspond to the x and y components of cfov. If cfov is not present, projected_picture_width and projected_picture_height may be 360 and 180, respectively, by default. The packed_reg_top and packed_reg_left equivalent information required for the unpacking may be derived based on the HQ viewport 725 dimensions, and may be derived by the receiver UE 640 (assuming the HQ viewport center corresponds to center of the ERP). The global coordinates may be obtained from the rotation information in a Rotation SEI message, or from global coordinates in the example RTP header illustrated in FIG. 4. c1 may indicate the Transform HQ viewport value, as further described below.

In LQ sphere packing, a2=packed_picture_width containing LQ sphere 727 (equivalent to region-wise packing packed_reg_width) and b2=packed_picture_height containing LQ sphere 727 (equivalent to region-wise packing packed_reg_height). If cfov is present, projected_width and projected_height of LQ sphere 727 may correspond to the x and y component of cfov. If cfov is not present, projected_width and projected_height may be 360 and 180, respectively, by default. The packed_reg_top and packed_reg_left equivalent information required for the unpacking may be 0 and 0 for LQ sphere 727. packed_picture_width and packed_picture_height may be derived from imageattr, as in the SDP session description described above. c2 may indicate the Transform LQ sphere value, as further described below.

Transform values for c1 and c2 may describe the following transform operations:
0: no transform
1: mirroring horizontally
2: rotation by 180 degrees (counter-clockwise)
3: rotation by 180 degrees (counter-clockwise) before mirroring horizontally
4: rotation by 90 degrees (counter-clockwise) before mirroring horizontally
5: rotation by 90 degrees (counter-clockwise)
6: rotation by 270 degrees (counter-clockwise) before mirroring horizontally
7: rotation by 270 degrees (counter-clockwise)

In summary, PPM [a1, b1, c1, a2,b2,c2] may be interpreted as PPM[packed_width of HQ viewport, packed_height of HQ viewport, Transform HQ viewport, packed_width LQ sphere, packed_height LQ sphere, Transform LQ sphere].

If only PPM is indicated, without any arguments, this may indicate that packed picture mapping information is delivered via RTP header extension or SEI message. In other words, PPM may be indicated to be supported by the UE, but signaling via SEI or RTP header extension may include packed picture mapping information.

Referring now to FIG. 6, at 620 data may be encoded, and at 622 data may be packetized. Encoding may be done by a single encoder with output always at the same resolution. This mode for delivery of omnidirectional video, where high-quality content is delivered for the viewport and low-quality content is delivered for other orientations, may only work with the sphere-locked VDD mode. At 630, the sender UE 610 may transmit a video stream to receiver UE 640, which may include rotation(s). PPM signaling may also be included in SDP signaling from the sender UE 610 to the receiver UE 640. The rotation information for the background and the viewport may be signaled separately, as described above with respect to 230 of FIG. 2. Signaling of the HQ viewport global coordinates may enable continued association of the delivered HQ viewport with the global coordinates while allowing the user's head motion to enable viewing of the HQ viewport margin or the LQ version of the entire 360-degree video.

Referring now to FIG. 6, data received from the sender UE 610 may be de-packetized 642 with the receiver UE 640. The de-packetized data may be decoded at 644, and the decoded data may be rotated at 646 such that the HQ viewport is rendered 648. As the orientation of the viewport changes, or at predetermined intervals, the HQ viewport orientation may be signaled 650 to the sender UE 610. The details of utilizing the packed-picture mapping (PPM), for example for rotating and rendering with the receiver UE 640, is described below.

In an example embodiment, a method for viewport dependent delivery for omnidirectional videos may be scalable for multiparty videoconferencing scenarios. This method may comprise a sender UE or MRF/MCU transcoding the omnidirectional video (which is received in high quality) into tiled version of the omnidirectional video at low-quality and high-quality. Optionally, more than two versions may be produced, each at a different quality level. The MCU may extract respective bitstreams from the low-quality and high-quality encoded versions with tiles according to each receiver viewport orientation for devices/users participating in the multiparty videoconferencing. This may require only a single encoding tiled version each for high-quality and low-quality omnidirectional video in case of mixed-quality approach, independent of the number of receivers and their viewport orientations. Each receiver UE participating in the multiparty videoconference may receive a respective single or merged bitstream. Thus, this method may enable a scalable solution for delivery of omnidirectional video to multiple receiver UEs, which may also support single-decoder-instance receiver implementation(s). In case of mixed-resolution approach, the MCU may encode at least one high-resolution representation of the omnidirectional video and one low-resolution representation of the omnidirectional video.

In the context of viewport-dependent 360-degree streaming, the term "tile" commonly refers to an isolated region, which depends only on the collocated isolated region in reference pictures and does not depend on any other picture regions. The term tile might or might not collocate with a picture partitioning unit called "tile" in some video coding standards, such as High-Efficiency Video Coding (HEVC).

In an example embodiment, the merging method capability of the MCU may be signaled to the receiver UEs, and the receiver UEs may respectively select a preferred margining option depending on the receiver UE's implementation preference. Alternatively, the MCU may select a merging method based on the preferences indicated by the receiver UEs.

Figure 8:
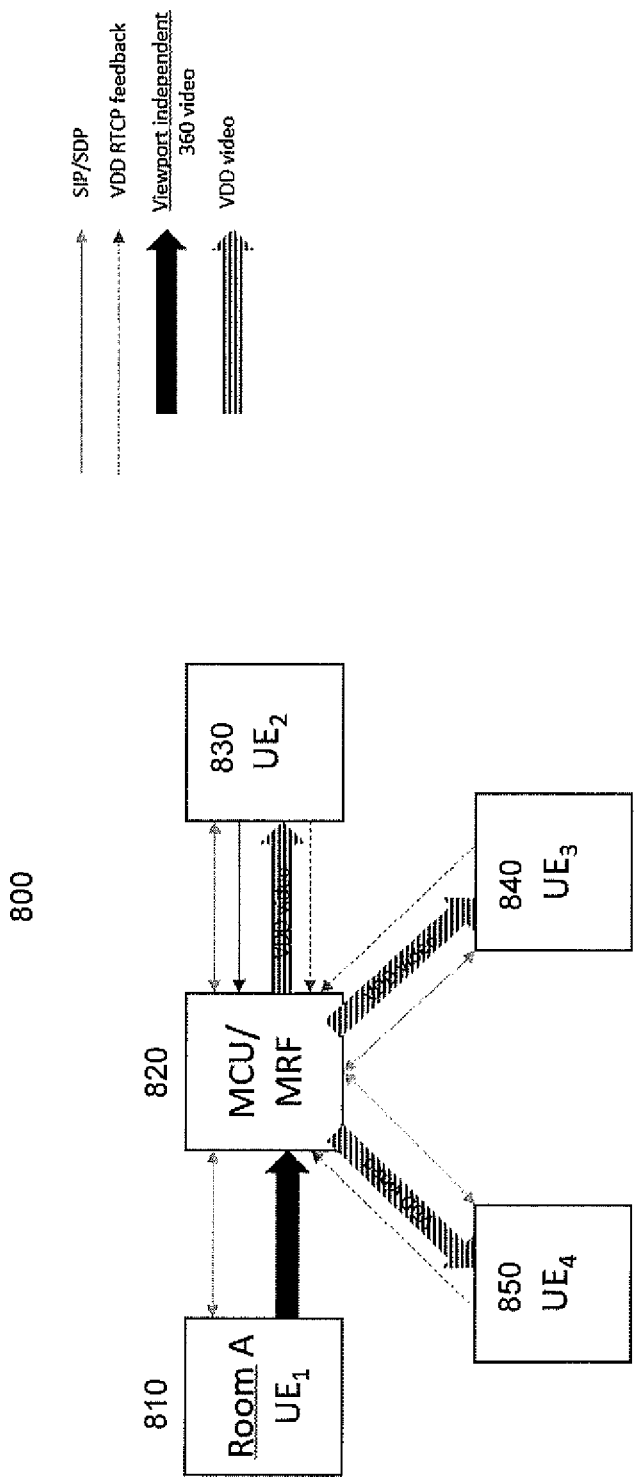
FIG. 8 is a diagram illustrating features as described herein.

Referring now to FIG. 8, illustrated is an example system 800 in which an example embodiment may be practiced, e.g. in which an MCU/MRF 820 may deliver customized viewport-dependent streams for multiple receiver UEs (830, 840, 850). For simplicity of explanation, without loss of generality, we assume a viewport independent high-quality video of room A from UE1 (810) may be delivered to MCU 820. MCU 820 may generate tiled videos of the received video of room A with at least two qualities, e.g. a high-quality tiled version for extracting tiles overlapping with the receiver UE's viewport, and a low-quality tiled version for extracting tiles corresponding to the other parts of the omnidirectional video. The tiling strategy may be based on SDP parameters describing each of the receiver UEs (830, 840, 850). The signaled information may comprise: a supported codec (e.g., AVC, HEVC, VVC, etc.); a receiver viewport size or FOV; whether the respective receiver UE provides support for region-wise or packed picture mapping (PPM); and/or preference of the respective receiver UE for a merging method (e.g. as a flag value associated with PPM). FIG. 8 illustrates SIP/SDP signaling between each of the receiver UEs (830, 840, 850) and the MCU/MRF 820.

An example SDP message is presented below, which describes a session description that may be used by an MCU (i.e. 820) to perform the different types of tile extraction and merging methods for delivering a single bitstream which is customized for each receiver UE viewport orientation (i.e. 830, 840, 850).

```
m=video 49154 RTP/AVP 98 100 99
mid=100
a=tcap:1 RTP/AVPF
a=pcfg:1 t=1
b=AS:950
b=RS:0
b=RR:5000
/ *omni video of room A* /
a=rtpmap:100 H265/90000
a=3gpp_360video:100   cap:VDP;   sm=Mono;   cfov: [x=360, y=180]
PPM:1/2 proj:ERP
a=fmtp:100 profile-id=1; level-id=93;
sprop-vps=QAEMAf / / AWAAAAMAgAAAAwAAAwBdLAUg;
sprop-sps=QgEBAWAAAAMAgAAAAwAAAwBdoAKAgC0WUuS0i9AHcIBB;
sprop-pps=RAHAcYDZIA==
a=imageattr:100 send [x=7680, y=4320] recv [x=1280, y=720]
a=3gpp_viewport:size= [a=100, y=90];
ctrl:device_signalled;margin= [l=10, r=10, t=10, b=10]
a=rtcp-fb:* trr-int 5000
a=rtcp-fb:* nack
a=rtcp-fb:* nack pli
a=rtcp-fb:* ccm fir
a=rtcp-fb:* ccm tmmbr
a=rtcp-fb:* viewport freq=30*
```

The PPM value of 1/2 indicates mixed quality merge approach if PPM value is 1, and mixed resolution if the PPM value is 2.

The MCU 820 may transcode the received high-quality omnidirectional video from UE1 (810) into a tiled version of the full sphere at lower quality for providing tiles for regions not covered by a receiver UE's viewport. Similarly, the MCU 820 may create a tiled version of the full sphere at high-quality for providing tiles for regions covered by a receiver UE's viewport. This approach may provide full freedom for the MCU 820 to deliver a respective VDD stream for each receiver (present and new joiners) with any viewport orientation as the initial viewport orientation.

The MCU 820 may extract and merge bit streams from the low-quality and high-quality encoded tiled versions for each receiver UE, according to the corresponding viewport orientation signaled by each receiver UE (830, 840, 850) via, for example, SIP/SDP signaling. Accordingly, each receiver UE may always receive a single (or merged) bitstream which can be decoded by a single decoder instance, as illustrated with arrows indicating VDD video delivered to the receiver UEs in FIG. 8.

For high-quality and low-quality versions with same resolution, mixed-quality tile extraction and merging with the MCU 820 may be enabled by having the following constraints for encoding the video with HEVC: motion-constrained tile sets (MCTS); a prediction hierarchy that is the same for both the quality versions; and the tile boundaries overlap.

The tile extraction and merging may also be implemented as a mixed-resolution method. The mixed-resolution and mixed-quality approaches have their respective benefits. In the following, the implications for the receiver UE are elaborated.

The mixed-resolution approach may provide higher effective resolution for a given decoder capability of a receiver UE (e.g., providing effective 6K or 8K resolution for a 4K decoder capability). However, this approach may cause additional complexity in the receiver UE implementation. Furthermore, the mixed-resolution approach has been observed to result in higher subjective quality degradation with reduced resolution outside the high-quality viewport region. This may be undesirable for some receiver UEs if significant head motion is expected.

The mixed-quality approach may be less complex for the receiver UE to implement, but cannot provide a higher effective resolution experience. In addition, the mixed-quality approach has been observed to result in gradual subjective quality degradation with reduced quality with same resolution outside the high-quality viewport region.

An implementation of mixed-resolution and mixed-quality operations by the receiver UEs, which receive mixed-resolution or mixed-quality packed-picture mapped (PPM) content, is analogous to how an OMAF player would process RWMQ (region-wise mapping mixed-quality) and RWMR (region-wise mapping mixed-resolution) video. In order to implement the mixed-quality as well as mixed-resolution merging, the packed-picture mapping information and/or modified region-wise packing information may need to be signaled to the receiver UE. The region-wise packing information, as specified in omnidirectional media format (OMAF), can be signaled as a supplemental enhancement information (SEI) message. Alternatively, there may be defined an RTP header extension which includes packed-picture mapping information, which is different from the OMAF region-wise packing structure. The mixed-resolution and mixed-quality client operation implementation is described in M. M. Hannuksela, Y.-K. Wang, and A. Hourunranta, "An overview of the OMAF standard for 360° video," Data Compression Conference, March 2019, which is hereby incorporated by reference in its entirety. The slice header and other bitstream rewriting required to create a conformant HEVC bitstream which can be decoded by a single decoder is described in OMAF 2nd edition draft (N19274, Potential improvement of OMAF, MPEG 130, April 2020), clause 4.6.4.2 and 10.1.5.4, which is hereby incorporated by reference in its entirety.

An example RTP header extension for Packed Picture Mapping(PPM) may be based on IETF RFC 5285 (2008): "A General Mechanism for RTP Header Extensions", D. Singer, H. Desineni, which is hereby incorporated by reference in its entirety. Following is an example urn to signal PPM in SDP:

a=extmap:5 urn:3gpp:packed-picture-mapping where the value 5 may be any value in the range 1-255 inclusive. The two-byte header format may be used. The PPM information may contain the center of the sent high-quality region (viewport and margin) with respect to the center of the global coordinates. Referring now to FIG. 9, illustrated is a possible RTP header extension format. The 8-bit ID may be the local identifier as defined in RFC 5285, incorporated by reference above. The length field (len) may indicate that 208 bytes follow. The field N_Regions may indicate the total number of pictures (n), and the value QR may indicate the index of the packed region that follows in this extension header. The index of the picture (QR) may be assigned based on quality, where the highest quality picture may be the first index (0) and lowest one being the last index (n−1). The TT field may indicate the transform type, which may be one of the following:

---

0: no transform
1: mirroring horizontally
2: rotation by 180 degrees (counter-clockwise)
3: rotation by 180 degrees (counter-clockwise) before mirroring horizontally
4: rotation by 90 degrees (counter-clockwise) before mirroring horizontally
5: rotation by 90 degrees (counter-clockwise)
6: rotation by 270 degrees (counter-clockwise) before mirroring horizontally
7: rotation by 270 degrees (counter-clockwise)

---

This example RTP header extension may be sent at the start of the picture. An update might be sent only when the packed-picture mapping (or modified region-wise packing) is changed. Alternatively, updates to the information conveyed with the example RTP header extension may be sent more regularly.

Fields of the example RTP header extension may be limited to 16 bits. Alternatively, the height/width fields may be given as a ratio (8 bit dec+8 bit non-dec) of the full picture size as defined by cfov, pfov.

Instead of creating two versions (high-quality and low-quality) of the omnidirectional video of room A from UE1 (810), the MCU 820 may choose to generate multiple quality levels with different step sizes of quantization (i.e. three or more tiled videos with different qualities). For example, the MCU 820 may create three versions of the video of room A: one with highest quality, for the viewport-orientation FOV (Field of View); one with a lower quality, for viewport margins; and one with a lowest quality, for other regions of the omnidirectional video sphere.

The selection of a high-quality region corresponding to viewport orientation of a receiver UE may also include different criteria, such as viewport margins, which may be useful for avoiding having low-quality video in the viewport due to head motion. Furthermore, the MCU 820 may consider quality criteria signaled by a receiver UE such as a preference for highest quality with possibility of having low-quality viewport regions (e.g., without margins), or, alternatively, a preference for consistent quality viewport with a slightly lower quality (e.g., with larger margins).

Figure 10:
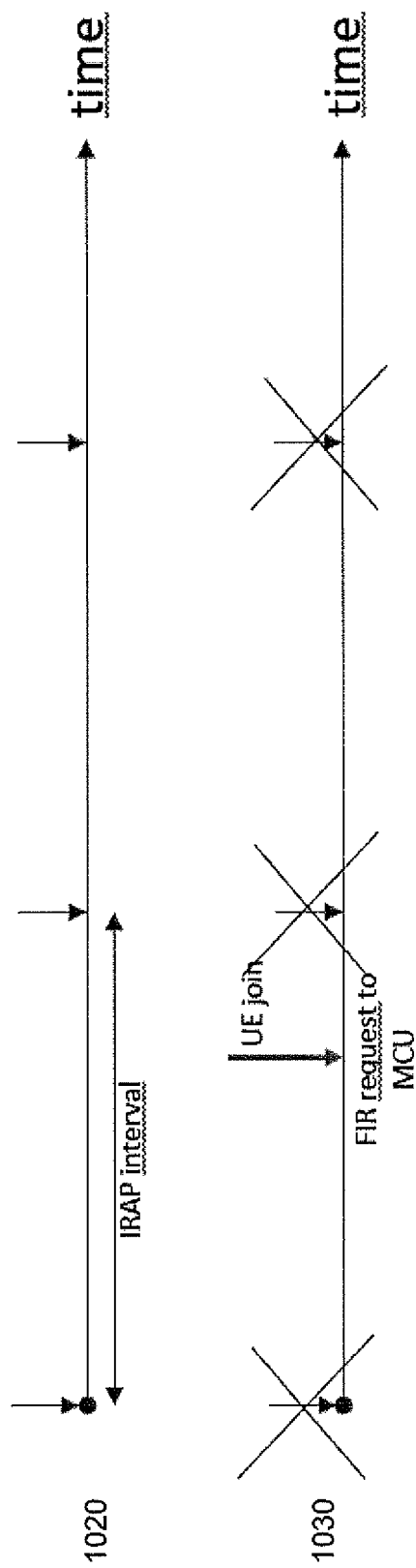
FIG. 10 is a diagram illustrating features as described herein.

In order to support multiple receiver UEs which may be re-joining or joining later, the MCU 820 may insert a Periodic Intra Refresh in signaling to the receiver UEs (e.g. 830, 840, 850). Alternatively, the receiver UE may request an intra random access picture (IRAP) which results in an I-frame for the entire ERP of low-quality/low-resolution and high-quality/high-resolution. The client request based IRAP may reduce the overall bitrate and bitrate spikes. Referring now to FIG. 10, illustrated is a comparison of an example MCU implementation comprising insertion of period IRAP, 1020, with an example UE implementation comprising UE request based IRAP, 1030. FIG. 10 illustrates that request based I-Frame requests, as in 1030, minimizes bitrate spikes and network congestion, while 1020 does not.

Figure 11:
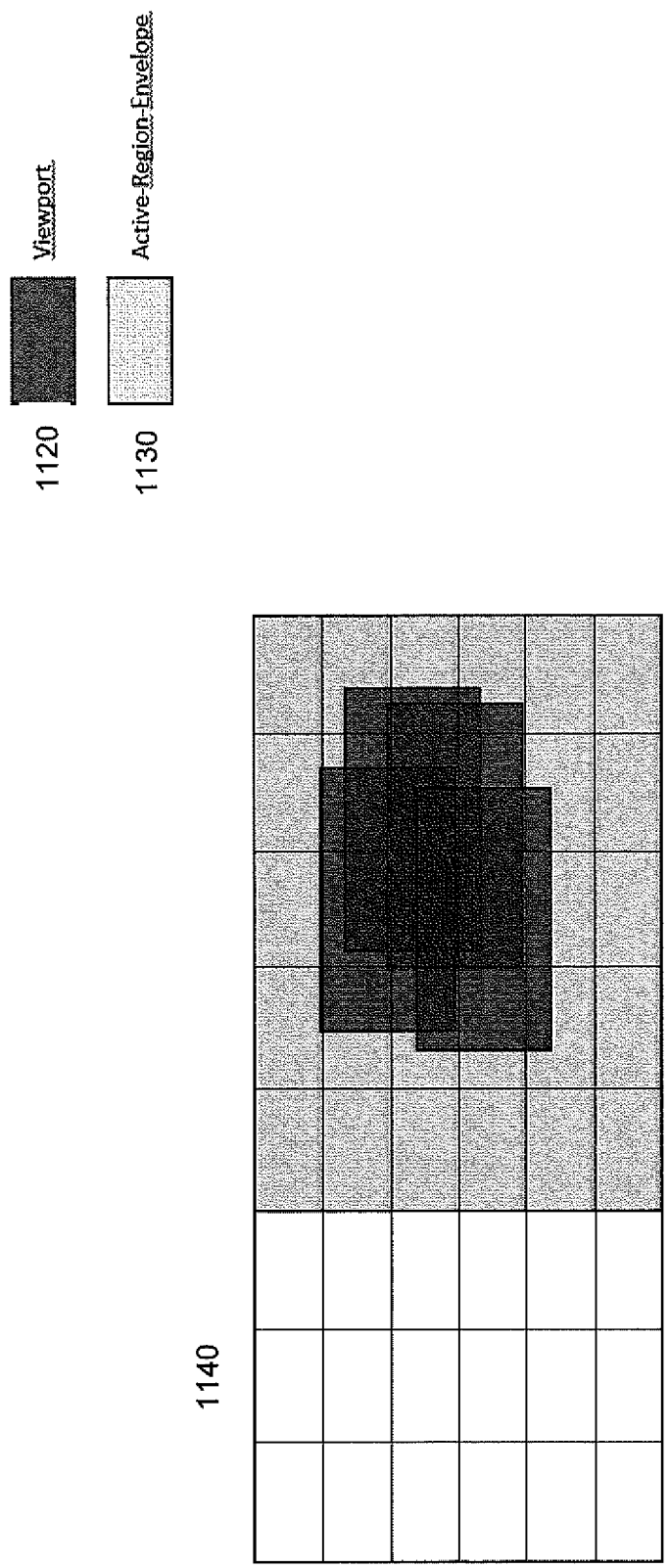
FIG. 11 is a diagram illustrating features as described herein.

In an example embodiment, an MCU may transcode only a part of the omnidirectional video based on the viewport orientations of the current receiver UEs. Referring now to FIG. 11, illustrated is an example of an MCU operating mode in which the MCU only provides VDD support to new UEs in a region which envelops the region covered by the current receiver UEs. This mode may be considered an "active-region-mode." An active-region-mode declaration by the MCU may indicate to receiver UEs joining for receipt of omnidirectional video that the MCU may maintain HQ video only for hotspot regions of the omnidirectional video. Receipt of this declaration may result in a new receiver UE starting with an initial viewing orientation which is within the current "active-region-envelope" even if the viewport orientation of the new receiver UE is not within the active-region-envelope 1130. For example, if the default policy is to provide a newly-joined receiver UE with (0, 0) of the full omnidirectional video as an initial viewing orientation, active-region-mode may, in contrast, result in a starting orientation which is according to the active-region-envelope. This may be detected by a receiver UE if the coordinates of the received viewport(s) are not according to the default (0, 0) policy. FIG. 11 illustrates multiple viewports 1120 within the active-region-envelope 1130. 1140 indicates a portion of the omnidirectional video for which, in the example of FIG. 11, the MCU does not provide initial VDD support. The receiver UEs may subsequently have full freedom to explore the omnidirectional video and modify the active region for the subsequent joining receiver UEs.

In an example embodiment, a method for viewport dependent encoding of the omnidirectional video with higher quality in the viewport orientation region may provide for a simplified rendering while reducing the bitrate for regions not in the user's viewport. This may be implemented as an embodiment where the omnidirectional video frame corresponding to the captured field of view is delivered with higher quality in the viewport region. This may be implemented by encoding parameters which provide higher quality in the region of interest (ROI) compared to the other regions. The feature of supporting ROI-based coding with quantization parameter (qp) maps may be implemented as an encoder feature in the MCU. This need not be done with tiling, as described with reference to FIG. 8 above, which often reduces encoder compression efficiency. This may serve to provide an omnidirectional video to receiver UEs without the need for complex unpacking operation(s). The entire omnidirectional video sphere may be delivered as a single encoded stream.

Various example embodiments for performing viewport dependent delivery (VDD) have been described in the present disclosure. Characteristics of several of the aspects/embodiments are summarized in the table below.

TABLE 1

| Aspect | Type of viewport dependent delivery | viewport parameter interpretation | Content availability for head-motion | Signaling method indication in SDP |
|---|---|---|---|---|
| 1 | HQ region only viewport-locked | Viewport parameter indicates the resolution of the delivered content viewport size <= imageattr | Not required. | VDP-VL |
| 1 | HQ region only sphere-locked | Viewport parameter indicates the resolution of the delivered content Viewport size + margin = imageattr | Additional margins can be available and usable. In limiting case, the margins can cover entire captured field of view | VDP-SL |
| 2 | HQ viewport and LQ sphere | Viewport parameter indicates the high-quality region and the low-quality sphere The delivered content consists of viewport size + margin + LQ sphere = imageattr | Additional HQ margins can be available Full freedom due to LQ sphere. | VDP-SL and PPM with packed picture information |
| 3 | Tile extraction and merging | HQ tiles covering the viewport region (viewport size + margin) + LQ tiles covering the rest of the capture sphere Cfov = imageattr | Additional HQ margins can be available Full freedom due to low-quality or low-resolution tiles for other parts of sphere | VDP-SL, PPM = 1 or 2 |
| 4 | ROI encoded omnidirectional video frame | HQ region described by (viewport size + margins) encoded with higher quality Cfov = imageattr | Additional HQ margins can be available Full freedom due to low-quality encoded video in regions outside viewport orientation | VDP-SL |

Aspect 1 of the table is described above with reference to, at least, FIG. 2. Aspect 2 of the table is described above with reference to, at least, FIG. 6. Aspect 3 of the table is described above with reference to, at least, FIG. 8.

The choice of an example embodiment for viewport dependent delivery described in the present disclosure may be made with reference to quality of service (QoS) considerations concerning each of the example embodiments.

In case of low-latency and lower bandwidth networks, delivery of only a part of the omnidirectional video in high quality with viewport-locked delivery, as described with reference to FIG. 2, may be considered because it may provide for minimal waste of bandwidth (i.e. there is minimal unwatched content), but requires frequent viewport signaling from receiver UE and low network RTT.

In case of high-latency and high bandwidth networks, delivery of only a part of the omnidirectional video in high quality with sphere-locked delivery, as described with reference to FIG. 2, or delivery of high quality viewport and a low quality representation of the omnidirectional video, as described with reference to FIG. 6, may be considered. In case of bandwidth constraint, the receiver UE may choose to switch from the latter to the former.

The VDD method described with reference to FIG. 8 may be useful for implementing scalable multi-receiver implementations.

Technical effects of the VDD method described with reference to FIG. 2, where only viewport region is delivered in HQ, may include a simpler implementation of the receiver UE, as merging of multiple streams may not be needed. In addition, same size of frames may be encoded despite projection. In other words, the shape of the input picture may be maintained for encoding. In addition, the example viewport-locked delivery mode may be efficient in terms of minimal wastage of bandwidth (negligible unseen content). Minimal changes, compared to a limited-FOV MTSI client implementation and efficient "follower UEs" that want to view the viewport orientation of a presenter, may be possible. In addition, the example sphere-locked delivery mode may enable use of margins. The receiver UEs negotiating a call may decide the suitable operating mode (viewport locked or sphere locked VDD). In addition, the example sphere-locked delivery mode may be used as an upgrade stream when delivered with another stream carrying the full sphere at low-quality. In case of network problems, the sphere-locked HQ stream may be dropped. Alternatively, if there are not any network problems, the sphere-locked HQ stream may not be dropped. The two streams may be grouped to indicate a relationship.

Technical effects of the VDD method described with reference to FIG. 6 may include that using packed delivery of LQ sphere and HQ viewport region may allow for static or infrequently changing (e.g. with session re-negotiation) packed-picture mapping or modified region-wise packing.

Technical effects of the VDD method described with reference to FIG. 8 may include performing few(er) encodings at the MCU in order to serve multiple receiver UEs with specific viewport-dependent streams. In addition, the ability to control the type of bitstream extraction and merging scheme while creating a bitstream for each viewport dependent stream may be useful.

In an example embodiment, the high-quality viewport may be defined based on an additional viewport margin, in addition to the receiver UE FOV, which may be based on an HMD or a conventional display.

In an example embodiment, the one or more receiver UEs may comprise respective single decoder instance client implementations.

Figure 12:
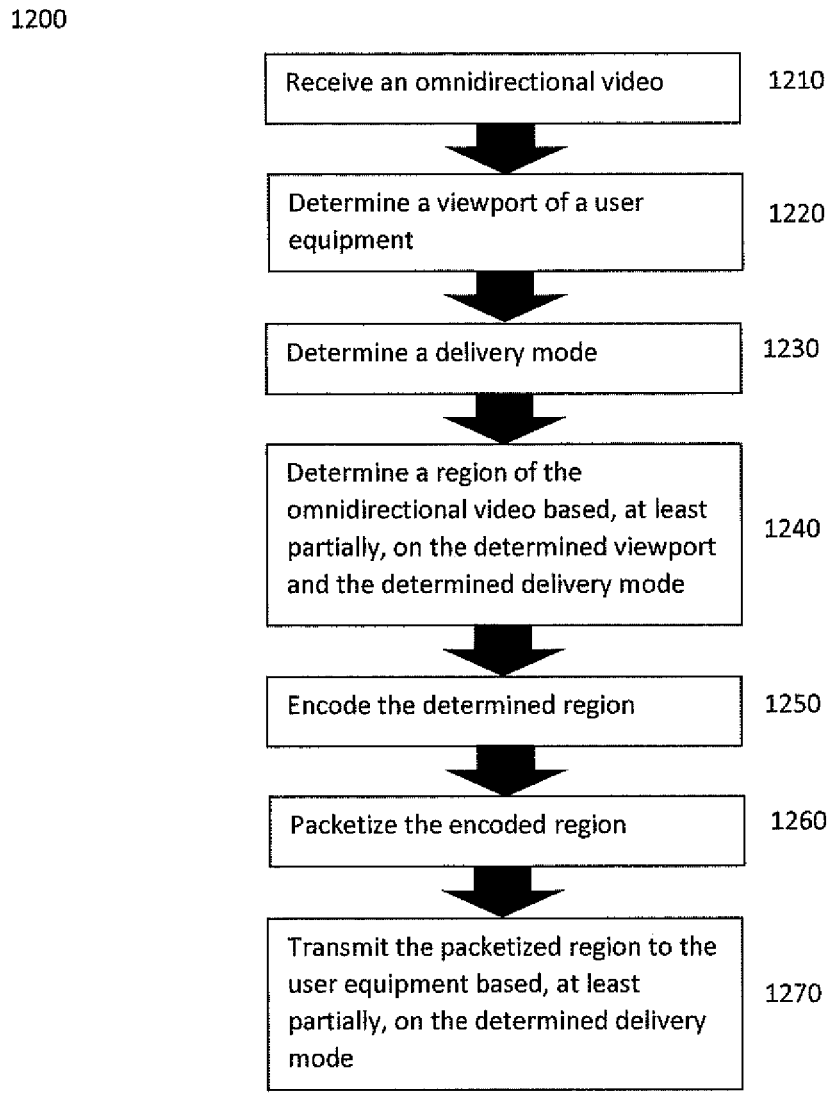
FIG. 12 is a flowchart illustrating steps as described herein.

FIG. 12 illustrates the potential steps of an example method 1200. The example method 1200 may be performed in a sender UE, an MCU, an MRF, or another device or function capable of receiving, manipulating, and transmitting data. The example method 1200 may include receiving an omnidirectional video, 1210. Receiving the omnidirectional video may comprise capturing the omnidirectional video or receiving the video from one or more capture devices. Receiving the omnidirectional video may optionally comprise stitching together a plurality of videos to generate the omnidirectional video. The example method 1200 may include determining a viewport of a user equipment, 1220. The user equipment may comprise a receiver user equipment. The example method 1200 may include determining a delivery mode, 1230. The delivery mode may comprise a viewport-locked delivery mode or a sphere-locked delivery mode. The example method 1200 may include determining a region of the omnidirectional video based, at least partially, on the determined viewport and the determined delivery mode, 1240. The example method 1200 may include encoding the determined region, 1250. The example method 1200 may include packetizing the encoded region, 1260. The example method 1200 may include transmitting the packetized region to the user equipment based, at least partially, on the determined delivery mode, 1270.

Figure 13:
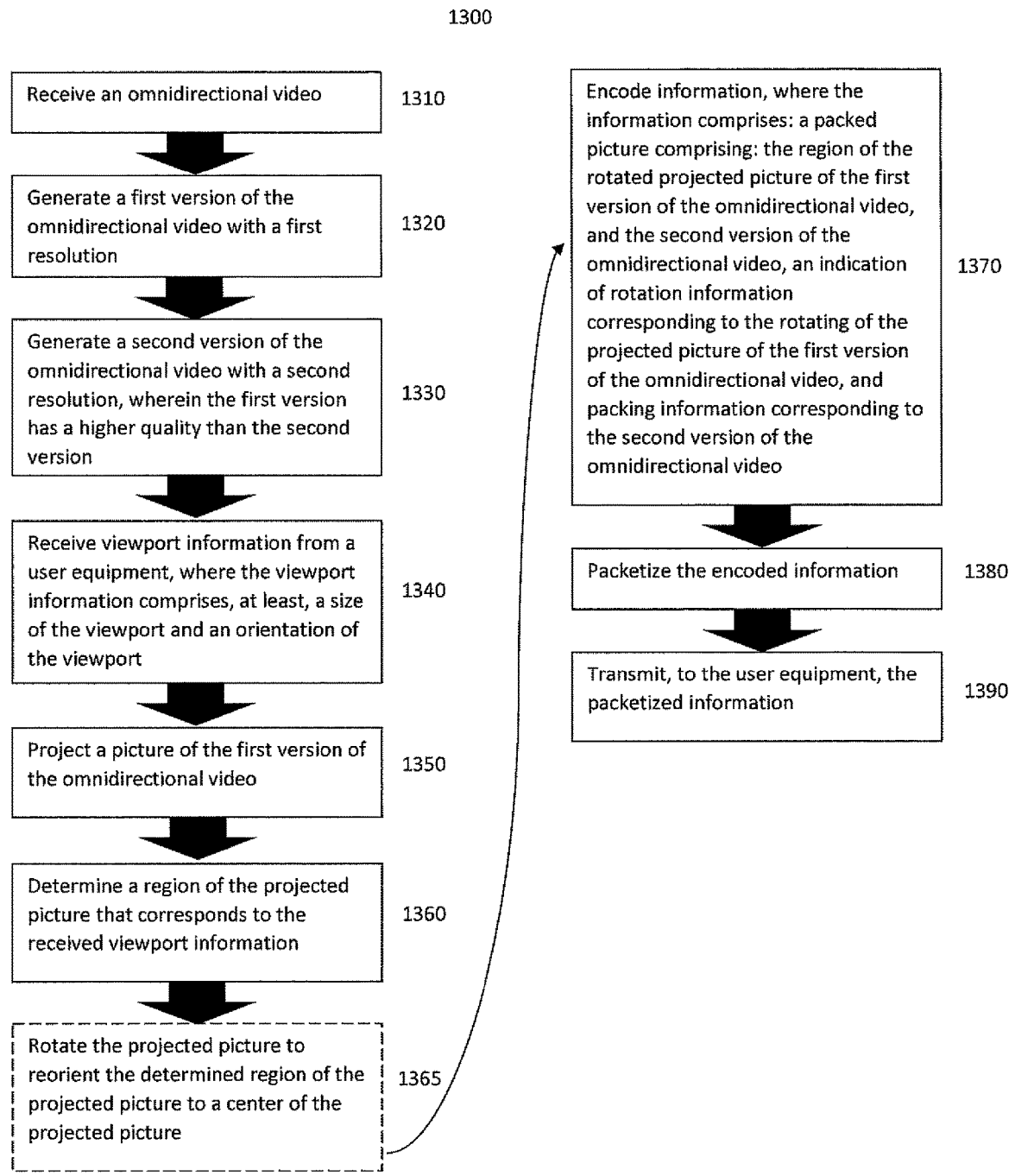
FIG. 13 is a flowchart illustrating steps as described herein.

FIG. 13 illustrates the potential steps of an example method 1300. The example method 1300 may be performed in a sender UE, an MCU, an MRF, or another device or function capable of receiving, manipulating, and transmitting data. The example method 1300 may include receiving an omnidirectional video, 1310. Receiving the omnidirectional video may comprise capturing the omnidirectional video or receiving the video from one or more capture devices. Receiving the omnidirectional video may optionally comprise stitching together a plurality of videos to generate the omnidirectional video. The example method 1300 may include generating a first version of the omnidirectional video with a first resolution, 1320. The example method 1300 may include generating a second version of the omnidirectional video with a second resolution, wherein the first version has a higher quality than the second version, 1330. The example method 1300 may include receiving viewport information from a user equipment, where the viewport information comprises, at least, a size of the viewport and an orientation of the viewport, 1340. The example method 1300 may include projecting a picture of the first version of the omnidirectional video, 1350. Projecting a picture of the omnidirectional video may comprise projecting a frame of the video onto a geometrical structure as described above with reference to equirectangular projection, although the projection is not limited to this type of projection. The example method 1300 may include determining a region of the projected picture that corresponds to the received viewport information, 1360. Optionally, the example method 1300 may include rotating the projected picture to reorient the determined region of the projected picture to a center of the projected picture, 1365. This step may be optional, as it is possible that the determined region is at the center of the picture as projected such that no rotation is required. The example method 1300 may include encoding information, where the information comprises: a packed picture comprising: the region of the rotated projected picture of the first version of the omnidirectional video, and the second version of the omnidirectional video, an indication of rotation information corresponding to the rotating of the projected picture of the first version of the omnidirectional video, and packing information corresponding to the second version of the omnidirectional video, 1370. The example method 1300 may include packetizing the encoded information, 1380. The example method 1300 may include transmitting, to the user equipment, the packetized information, 1390.

Figure 14:
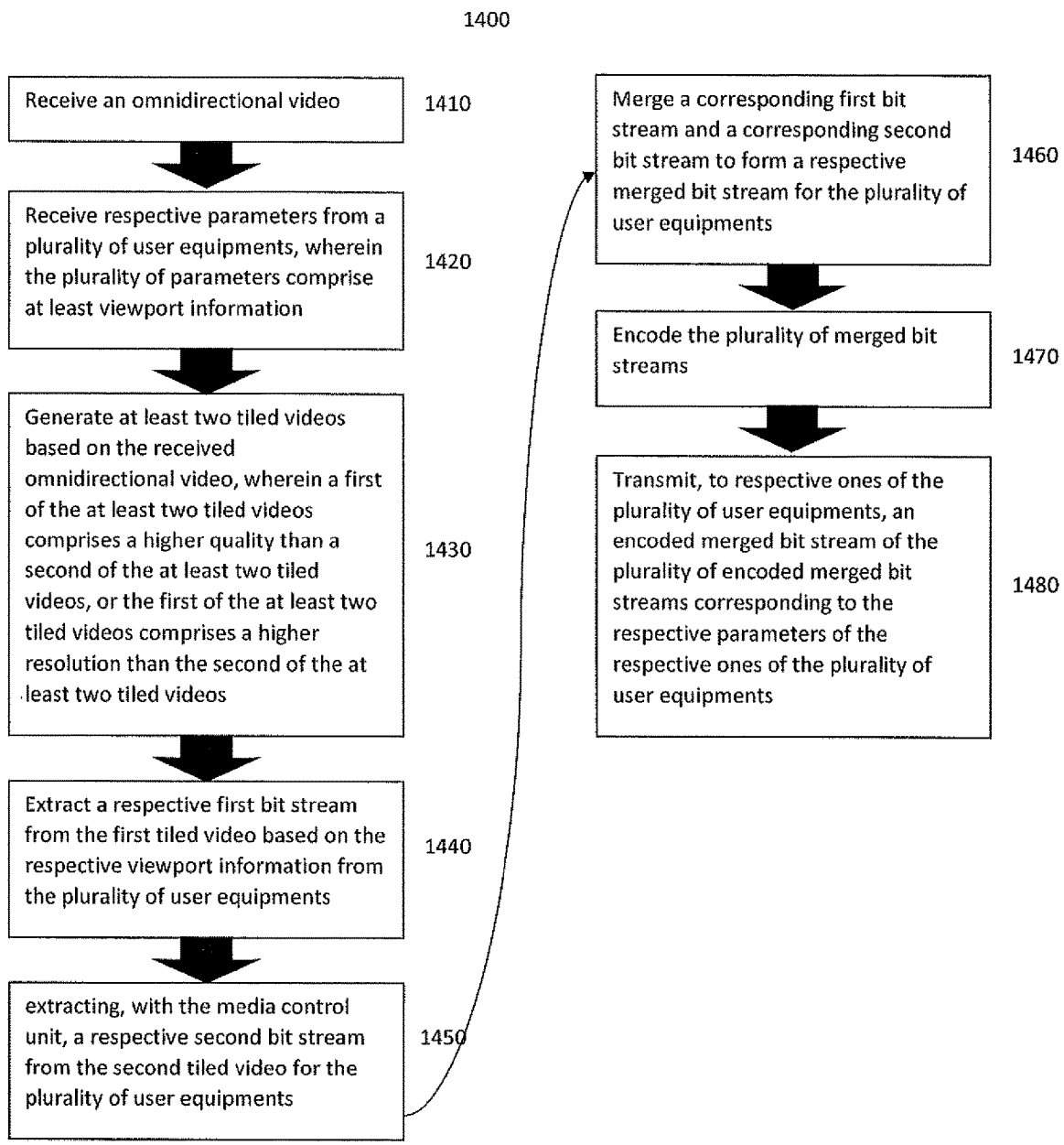
FIG. 14 is a flowchart illustrating steps as described herein.

FIG. 14 illustrates the potential steps of an example method 1400. The example method 1400 may be performed in a sender UE, an MCU, an MRF, or another device or function capable of receiving, manipulating, and transmitting data. The example method 1400 may include receiving, with, e.g., a media control unit, an omnidirectional video, 1410. Receiving the omnidirectional video may comprise capturing the omnidirectional video or receiving the video from one or more capture devices. Receiving the omnidirectional video may optionally comprise stitching together a plurality of videos to generate the omnidirectional video. The example method 1400 may include receiving, with, e.g., the media control unit, respective parameters from a plurality of user equipments, wherein the plurality of parameters comprise at least viewport information, 1420. The example method 1400 may include generating, with, e.g., the media control unit, at least two tiled videos based on the received omnidirectional video, wherein a first of the at least two tiled videos comprises a higher quality than a second of the at least two tiled videos, or the first of the at least two tiled videos comprises a higher resolution than the second of the at least two tiled videos, 1430. The example method 1400 may include extracting, with, e.g., the media control unit, a respective first bit stream from the first tiled video based on the respective viewport information from the plurality of user equipments, 1440. In other words, for each of the user equipments, a first bit stream may be extracted based on the viewport information received from that particular user equipment. The example method 1400 may include extracting, with, e.g., the media control unit, a respective second bit stream from the second tiled video for the plurality of user equipments, 1450. The second bit stream may be the same or different for each of the plurality of user equipments. The example method 1400 may include merging, with, e.g., the media control unit, a corresponding first bit stream and a corresponding second bit stream to form a respective merged bit stream for the plurality of user equipments, 1460. In other words, a first bit stream and a second bit stream may be extracted for each of the plurality of user equipments, and the bit streams extracted for each user equipment may be merged together. Accordingly, a merged bit stream may be formed for each of the plurality of user equipments. The example method 1400 may include encoding, with, e.g., the media control unit, the plurality of merged bit streams, 1470. Each of the plurality of merged bit streams may be separately encoded. The example method 1400 may include transmitting, to respective ones of the plurality of user equipments, an encoded merged bit stream of the plurality of encoded merged bit streams corresponding to the respective parameters of the respective ones of the plurality of user equipments, 1480. As a result, each of the plurality of user equipments may receive a merged bit stream corresponding to the parameters previously sent to, for example, the media control unit.

Figure 15:
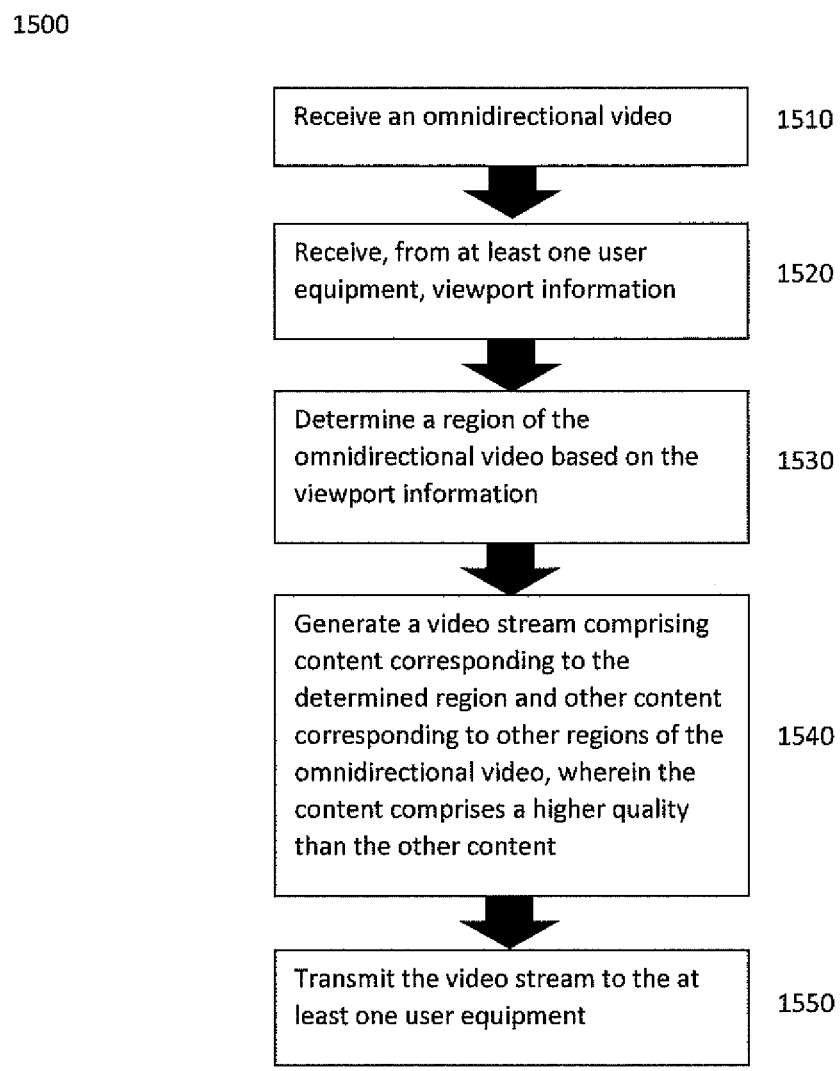
FIG. 15 is a flowchart illustrating steps as described herein.

FIG. 15 illustrates the potential steps of an example method 1500. The example method 1500 may be performed in a sender UE, an MCU, an MRF, or another device or function capable of receiving, manipulating, and transmitting data. The example method 1500 may include receiving an omnidirectional video, 1510. Receiving the omnidirectional video may comprise capturing the omnidirectional video or receiving the video from one or more capture devices. Receiving the omnidirectional video may optionally comprise stitching together a plurality of videos to generate the omnidirectional video. The example method 1500 may include receiving, from at least one user equipment, viewport information, 1520. The example method 1500 may include determining a region of the omnidirectional video based on the viewport information, 1530. The example method 1500 may include generating a video stream comprising content corresponding to the determined region and other content corresponding to other regions of the omnidirectional video, wherein the content comprises a higher quality than the other content, 1540. The example method 1500 may include transmitting the video stream to the at least one user equipment, 1550.

In accordance with one aspect, an example method may be provided comprising: receiving an omnidirectional video; determining a viewport of a user equipment; determining a delivery mode; determining a region of the omnidirectional video based, at least partially, on the determined viewport and the determined delivery mode; encoding the determined region; packetizing the encoded region; and transmitting the packetized region to the user equipment based, at least partially, on the determined delivery mode.

The determining of the viewport of the user equipment may be based, at least partially, on a received message, wherein the received message may comprise at least one of: field of view information of the user equipment, region of interest information of the user equipment a size of the viewport, an elevation of the viewport, a range of the elevation of the viewport, an azimuth of the viewport, a range of the azimuth of the viewport, a tilt of the viewport, or a zoom factor, wherein the received message is received via one of: a session description protocol, a real-time transport protocol, or a session control transport protocol or any other suitable protocol.

The receiving of the omnidirectional video may comprise receiving two or more images captured with respective sensors; and stitching together the two or more images to create the omnidirectional video.

The example method may further comprise receiving signaling comprising orientation information for the viewport of the user equipment, wherein the signaling may comprise one of real-time transport control protocol signaling or stream control transport protocol signaling.

The determining of the delivery mode may be based on a received session description protocol message or real-time transport control protocol message, wherein the received message may comprise an indication that the user equipment supports at least one of a sphere-locked delivery mode or a viewport-locked delivery mode.

The determined delivery mode may comprise a viewport-locked delivery mode, wherein the determining of the region of the omnidirectional video may further comprise: projecting a picture of the omnidirectional video; determining a region of the projected picture that corresponds to the determined viewport; and rotating the projected picture to reorient the determined region of the projected picture to a center of the projected picture.

The determined delivery mode may comprise a sphere-locked delivery mode, wherein the determining of the region of the omnidirectional video may comprise mapping the determined viewport to the omnidirectional video, wherein the encoded region may remain attached to the omnidirectional video, and wherein the transmitting of the packetized region to the user equipment may further comprise signaling global coordinates of the determined region within the omnidirectional video, wherein the signaling of the global coordinates may comprise one of: a supplemental enhancement information message, an extended real-time transport protocol header, or a signal transmitted with a real-time transport protocol stream separate from a video stream with which the packetized region is delivered to the user equipment.

The encoding of the determined region of the omnidirectional video may comprise encoding with a single encoder, wherein the single encoder may be configured to output with a resolution dependent on a size of the determined viewport, and independent of an orientation of the determined viewport.

The transmitting of the packetized region of the omnidirectional video may comprise transmitting the packetized region of the omnidirectional video in a video stream.

The example method may further comprise receiving one or more head motion information updates from the user equipment; and updating the determined viewport based on the one or more received head motion information updates.

The one or more updates may be received as real-time transport protocol feedback information.

The determining of the viewport may comprise determining one or more margins of the viewport.

In accordance with one example embodiment, an apparatus may comprise: at least one processor; and at least one memory including computer program code; the at least one memory and the computer program code configured to, with the at least one processor, cause the apparatus to: receive an omnidirectional video; determine a viewport of a user equipment; determine a delivery mode; determine a region of the omnidirectional video based, at least partially, on the determined viewport and the determined delivery mode; encode the determined region; packetize the encoded region; and transmit the packetized region to the user equipment based, at least partially, on the determined delivery mode.

Determining the viewport of the user equipment may be based, at least partially, on a received message, wherein the received message may comprise at least one of: field of view information of the user equipment, region of interest information of the user equipment, a size of the viewport, an elevation of the viewport, a range of the elevation of the viewport, an azimuth of the viewport, a range of the azimuth of the viewport, a tilt of the viewport, or a zoom factor, wherein the received message is received via one of: a session description protocol, a real-time transport protocol, or a session control transport protocol or any other suitable protocol.

Receiving the omnidirectional video may comprise receiving two or more images captured with respective sensors; and wherein the at least one memory and the computer program code may be configured to, with the at least one processor, cause the apparatus to: stitch together the two or more images to create the omnidirectional video.

The at least one memory and the computer program code may be configured to, with the at least one processor, further cause the apparatus to: receive signaling comprising orientation information for the viewport of the user equipment, wherein the signaling may comprise one of real-time transport control protocol signaling or stream control transport protocol signaling.

Determining the delivery mode may be based on a received session description protocol message or real-time transport control protocol message, wherein the received message may comprise an indication that the user equipment supports at least one of a sphere-locked delivery mode or a viewport-locked delivery mode.

The determined delivery mode may comprise a viewport-locked delivery mode, wherein the determining of the region of the omnidirectional video may further comprise the at least one memory and the computer program code may be configured to, with the at least one processor, cause the apparatus to: project a picture of the omnidirectional video; determine a region of the projected picture that corresponds to the determined viewport; and rotate the projected picture to reorient the determined region of the projected picture to a center of the projected picture.

The determined delivery mode may comprise a sphere-locked delivery mode, wherein determining the region of the omnidirectional video may comprise the at least one memory and the computer program code may be configured to, with the at least one processor, cause the apparatus to map the determined viewport to the omnidirectional video, wherein the encoded region may remain attached to the omnidirectional video, and wherein transmitting the packetized region to the user equipment may further comprise the at least one memory and the computer program code may be configured to, with the at least one processor, cause the apparatus to signal global coordinates of the determined region within the omnidirectional video, wherein the signaling of the global coordinates may comprise one of: a supplemental enhancement information message, an extended real-time transport protocol header, or a signal transmitted with a real-time transport protocol stream separate from a video stream with which the packetized region is delivered to the user equipment.

Encoding the determined region of the omnidirectional video may comprise the at least one memory and the computer program code may be configured to, with the at least one processor, cause the apparatus to: encode with a single encoder, wherein the single encoder may be configured to output with a resolution dependent on a size of the determined viewport, and independent of an orientation of the determined viewport.

Transmitting the packetized region of the omnidirectional video may comprise the at least one memory and the computer program code may be configured to, with the at least one processor, cause the apparatus to: transmit the packetized region of the omnidirectional video in a video stream.

The at least one memory and the computer program code may be configured to, with the at least one processor, further cause the apparatus to: receive one or more head motion information updates from the user equipment; and update the determined viewport based on the one or more received head motion information updates.

The one or more updates may be received as real-time transport protocol feedback information.

Determining the viewport may comprise determining one or more margins of the viewport.

In accordance with one example embodiment, an apparatus may comprise: circuitry configured to perform: receive an omnidirectional video; determine a viewport of a user equipment; determine a delivery mode; determine a region of the omnidirectional video based, at least partially, on the determined viewport and the determined delivery mode; encode the determined region; packetize the encoded region; and transmit the packetized region to the user equipment based, at least partially, on the determined delivery mode.

In accordance with one example embodiment, an apparatus may comprise: processing circuitry; memory circuitry including computer program code, the memory circuitry and the computer program code configured to, with the processing circuitry, enable the apparatus to: receive an omnidirectional video; determine a viewport of a user equipment; determine a delivery mode; determine a region of the omnidirectional video based, at least partially, on the determined viewport and the determined delivery mode; encode the determined region; packetize the encoded region; and transmit the packetized region to the user equipment based, at least partially, on the determined delivery mode.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In accordance with one example embodiment, an apparatus may comprise means for performing: receiving an omnidirectional video; determining a viewport of a user equipment; determining a delivery mode; determining a region of the omnidirectional video based, at least partially, on the determined viewport and the determined delivery mode; encoding the determined region; packetizing the encoded region; and transmitting the packetized region to the user equipment based, at least partially, on the determined delivery mode.

The means for determining the viewport of the user equipment may be configured to determine the viewport of the user equipment based, at least partially, on a received message, wherein the received message may comprise at least one of: field of view information of the user equipment, region of interest information of the user equipment, a size of the viewport, an elevation of the viewport, a range of the elevation of the viewport, an azimuth of the viewport, a range of the azimuth of the viewport, a tilt of the viewport, or a zoom factor, wherein the received message is received via one of: a session description protocol, a real-time transport protocol, or a session control transport protocol or any other suitable protocol.

The means for receiving the omnidirectional video may comprise means for receiving two or more images captured with respective sensors; and may further comprise means for stitching together the two or more images to create the omnidirectional video.

The example apparatus may further comprise means for receiving signaling comprising orientation information for the viewport of the user equipment, wherein the signaling may comprise one of real-time transport control protocol signaling or stream control transport protocol signaling.

The means for determining the delivery mode may be configured to determine the delivery mode based on a received session description protocol message or real-time transport control protocol message, wherein the received message may comprise an indication that the user equipment supports at least one of a sphere-locked delivery mode or a viewport-locked delivery mode.

The determined delivery mode may comprise a viewport-locked delivery mode, wherein the means for determining the region of the omnidirectional video may further comprise means for: projecting a picture of the omnidirectional video; determining a region of the projected picture that corresponds to the determined viewport; and rotating the projected picture to reorient the determined region of the projected picture to a center of the projected picture.

The determined delivery mode may comprise a sphere-locked delivery mode, wherein the means for determining the region of the omnidirectional video may further comprise means for mapping the determined viewport to the omnidirectional video, wherein the encoded region may remain attached to the omnidirectional video, and wherein the means for transmitting the packetized region to the user equipment may further comprise means for signaling global coordinates of the determined region within the omnidirectional video, wherein the signaling of the global coordinates may comprise one of: a supplemental enhancement information message, an extended real-time transport protocol header, or a signal transmitted with a real-time transport protocol stream separate from a video stream with which the packetized region is delivered to the user equipment.

The means for encoding the determined region of the omnidirectional video may comprise means for encoding with a single encoder, wherein the single encoder may be configured to output with a resolution dependent on a size of the determined viewport, and independent of an orientation of the determined viewport.

The means for transmitting the packetized region of the omnidirectional video may comprise means for transmitting the packetized region of the omnidirectional video in a video stream.

The example apparatus may further comprise means for: receiving one or more head motion information updates from the user equipment; and updating the determined viewport based on the one or more received head motion information updates.

The one or more updates may be received as real-time transport protocol feedback information.

The means for determining the viewport may comprise means for determining one or more margins of the viewport.

In accordance with one example embodiment, a non-transitory computer-readable medium comprising program instructions stored thereon which, when executed with at least one processor, cause the at least one processor to: receive an omnidirectional video; determine a viewport of a user equipment; determine a delivery mode; determine a region of the omnidirectional video based, at least partially, on the determined viewport and the determined delivery mode; encode the determined region; packetize the encoded region; and transmit the packetized region to the user equipment based, at least partially, on the determined delivery mode.

Determining the viewport of the user equipment may be based, at least partially, on a received message, wherein the received message may comprise at least one of: field of view information of the user equipment, region of interest information of the user equipment, a size of the viewport, an elevation of the viewport, a range of the elevation of the viewport, an azimuth of the viewport, a range of the azimuth of the viewport, a tilt of the viewport, or a zoom factor, wherein the received message is received via one of: a session description protocol, a real-time transport protocol, or a session control transport protocol or any other suitable protocol.

Receiving the omnidirectional video may comprise receiving two or more images captured with respective sensors; and wherein the program instructions stored thereon, when executed with the at least one processor, may further cause the at least one processor to: stitch together the two or more images to create the omnidirectional video.

The program instructions stored thereon, when executed with the at least one processor, may further cause the at least one processor to: receive signaling comprising orientation information for the viewport of the user equipment, wherein the signaling may comprise one of real-time transport control protocol signaling or stream control transport protocol signaling.

Determining the delivery mode may be based on a received session description protocol message or real-time transport control protocol message, wherein the received message may comprise an indication that the user equipment supports at least one of a sphere-locked delivery mode or a viewport-locked delivery mode.

The determined delivery mode may comprise a viewport-locked delivery mode, wherein the determining of the region of the omnidirectional video may comprise program instructions stored thereon which, when executed with the at least one processor, may further cause the at least one processor to: project a picture of the omnidirectional video; determine a region of the projected picture that corresponds to the determined viewport; and rotate the projected picture to reorient the determined region of the projected picture to a center of the projected picture.

The determined delivery mode may comprise a sphere-locked delivery mode, wherein determining the region of the omnidirectional video may comprise program instructions stored thereon which, when executed with the at least one processor, may further cause the at least one processor to map the determined viewport to the omnidirectional video, wherein the encoded region may remain attached to the omnidirectional video, and wherein transmitting the packetized region to the user equipment may comprise program instructions stored thereon which, when executed with the at least one processor, may further cause the at least one processor to signal global coordinates of the determined region within the omnidirectional video, wherein the signaling of the global coordinates may comprise one of: a supplemental enhancement information message, an extended real-time transport protocol header, or a signal transmitted with a real-time transport protocol stream separate from a video stream with which the packetized region is delivered to the user equipment.

Encoding the determined region of the omnidirectional video may comprise program instructions stored thereon which, when executed with the at least one processor, may further cause the at least one processor to: encode with a single encoder, wherein the single encoder may be configured to output with a resolution dependent on a size of the determined viewport, and independent of an orientation of the determined viewport.

Transmitting the packetized region of the omnidirectional video may comprise program instructions stored thereon which, when executed with the at least one processor, may further cause the at least one processor to: transmit the packetized region of the omnidirectional video in a video stream.

The example apparatus may further comprise program instructions stored thereon which, when executed with the at least one processor, may further cause the at least one processor to: receive one or more head motion information updates from the user equipment; and update the determined viewport based on the one or more received head motion information updates.

The one or more updates may be received as real-time transport protocol feedback information.

Determining the viewport may comprise determining one or more margins of the viewport.

In accordance with one aspect, an example method may be provided comprising: receiving an omnidirectional video; generating a first version of the omnidirectional video with a first resolution; generating a second version of the omnidirectional video with a second resolution, wherein the first version may have a higher quality than the second version; receiving viewport information from a user equipment, where the viewport information may comprise, at least, a size of the viewport and an orientation of the viewport; projecting a picture of the first version of the omnidirectional video; determining a region of the projected picture that corresponds to the received viewport information; rotating the projected picture to reorient the determined region of the projected picture to a center of the projected picture; encoding information, where the information comprises: a packed picture comprising: the region of the rotated projected picture of the first version of the omnidirectional video, and the second version of the omnidirectional video, an indication of rotation information corresponding to the rotating of the projected picture of the first version of the omnidirectional video, and packing information corresponding to the second version of the omnidirectional video; packetizing the encoded information; and transmitting, to the user equipment, the packetized information.

The receiving of the viewport information from the user equipment may comprise receiving signaling comprising at least one session description protocol message, wherein the signaling may comprise an indication of at least one mapping type supported by the user equipment, wherein the at least one supported mapping type may comprise at least one of: region-wise packing, modified region-wise packing, packed-picture mapping, or projected-picture mapping.

The example method may further comprise transmitting, to the user equipment, using session description protocol signaling, packed picture mapping information separately from the packetized information, wherein the session description protocol signaling may comprise at least one of: an indication of a width of the region of the rotated projected picture of the first version of the omnidirectional video in the packed picture; an indication of the height of the region of the rotated projected picture of the first version of the omnidirectional video in the packed picture; an indication of a transform of the region of the rotated projected picture of the first version of the omnidirectional video in the packed picture; an indication of the width of the second version of the omnidirectional video in the packed picture; an indication of the height of the second version of the omnidirectional video in the packed picture; or an indication of a transform of the second version of the omnidirectional video in the packed picture.

The determining of the region of the projected picture that corresponds to the received viewport information may comprise determining a region based on the size of the viewport and one or more margins applied to the viewport.

The example method may further comprise signaling packed picture mapping information to the user equipment with one of: real-time transport protocol signaling, or supplemental enhancement information.

The encoding of the information may comprise encoding with a single encoder, wherein the single encoder may be configured to output with a resolution dependent on a size of the determined viewport, and independent of an orientation of the determined viewport.

In accordance with one example embodiment, an apparatus may comprise: at least one processor; and at least one memory including computer program code; the at least one memory and the computer program code configured to, with the at least one processor, cause the apparatus to: receive an omnidirectional video; generate a first version of the omnidirectional video with a first resolution; generate a second version of the omnidirectional video with a second resolution, wherein the first version has a higher quality than the second version; receive viewport information from a user equipment, where the viewport information comprises, at least, a size of the viewport and an orientation of the viewport; project a picture of the first version of the omnidirectional video; determine a region of the projected picture that corresponds to the received viewport information; rotate the projected picture to reorient the determined region of the projected picture to a center of the projected picture; encode information, where the information may comprise: a packed picture that may comprise: the region of the rotated projected picture of the first version of the omnidirectional video, and the second version of the omnidirectional video, an indication of rotation information corresponding to the rotating of the projected picture of the first version of the omnidirectional video, and packing information corresponding to the second version of the omnidirectional video; packetize the encoded information; and transmit to the user equipment, the packetized information.

Receiving the viewport information from the user equipment may comprise receiving signaling comprising at least one session description protocol message, wherein the signaling may comprise an indication of at least one mapping type supported by the user equipment, wherein the at least one supported mapping type may comprise at least one of: region-wise packing, modified region-wise packing, packed-picture mapping, or projected-picture mapping.

The at least one memory and the computer program code may be configured to, with the at least one processor, further cause the apparatus to: transmit, to the user equipment, using session description protocol signaling, packed picture mapping information separately from the packetized information, wherein the session description protocol signaling may comprise at least one of: an indication of a width of the region of the rotated projected picture of the first version of the omnidirectional video in the packed picture; an indication of the height of the region of the rotated projected picture of the first version of the omnidirectional video in the packed picture; an indication of a transform of the region of the rotated projected picture of the first version of the omnidirectional video in the packed picture; an indication of the width of the second version of the omnidirectional video in the packed picture; an indication of the height of the second version of the omnidirectional video in the packed picture; or an indication of a transform of the second version of the omnidirectional video in the packed picture.

Determining the region of the projected picture that corresponds to the received viewport information may comprise determining a region based on the size of the viewport and one or more margins applied to the viewport.

The at least one memory and the computer program code may be configured to, with the at least one processor, further cause the apparatus to: signal packed picture mapping information to the user equipment with one of: real-time transport protocol signaling, or supplemental enhancement information.

Encoding the information may comprise encoding with a single encoder, wherein the single encoder is configured to output with a resolution dependent on a size of the determined viewport, and independent of an orientation of the determined viewport.

In accordance with one example embodiment, an apparatus may comprise: circuitry configured to perform: receive an omnidirectional video; generate a first version of the omnidirectional video with a first resolution; generate a second version of the omnidirectional video with a second resolution, wherein the first version has a higher quality than the second version; receive viewport information from a user equipment, where the viewport information comprises, at least, a size of the viewport and an orientation of the viewport; project a picture of the first version of the omnidirectional video; determine a region of the projected picture that corresponds to the received viewport information; rotate the projected picture to reorient the determined region of the projected picture to a center of the projected picture; encode information, where the information may comprise: a packed picture that may comprise: the region of the rotated projected picture of the first version of the omnidirectional video, and the second version of the omnidirectional video, an indication of rotation information corresponding to the rotating of the projected picture of the first version of the omnidirectional video, and packing information corresponding to the second version of the omnidirectional video; packetize the encoded information; and transmit to the user equipment, the packetized information.

In accordance with one example embodiment, an apparatus may comprise: processing circuitry; memory circuitry including computer program code, the memory circuitry and the computer program code configured to, with the processing circuitry, enable the apparatus to: receive an omnidirectional video; generate a first version of the omnidirectional video with a first resolution; generate a second version of the omnidirectional video with a second resolution, wherein the first version has a higher quality than the second version; receive viewport information from a user equipment, where the viewport information comprises, at least, a size of the viewport and an orientation of the viewport; project a picture of the first version of the omnidirectional video; determine a region of the projected picture that corresponds to the received viewport information; rotate the projected picture to reorient the determined region of the projected picture to a center of the projected picture; encode information, where the information may comprise: a packed picture that may comprise: the region of the rotated projected picture of the first version of the omnidirectional video, and the second version of the omnidirectional video, an indication of rotation information corresponding to the rotating of the projected picture of the first version of the omnidirectional video, and packing information corresponding to the second version of the omnidirectional video; packetize the encoded information; and transmit to the user equipment, the packetized information.

In accordance with one example embodiment, an apparatus may comprise means for performing: receiving an omnidirectional video; generating a first version of the omnidirectional video with a first resolution; generating a second version of the omnidirectional video with a second resolution, wherein the first version has a higher quality than the second version; receiving viewport information from a user equipment, where the viewport information comprises, at least, a size of the viewport and an orientation of the viewport; projecting a picture of the first version of the omnidirectional video; determining a region of the projected picture that corresponds to the received viewport information; rotating the projected picture to reorient the determined region of the projected picture to a center of the projected picture; encoding information, where the information may comprise: a packed picture comprising: the region of the rotated projected picture of the first version of the omnidirectional video, and the second version of the omnidirectional video, an indication of rotation information corresponding to the rotating of the projected picture of the first version of the omnidirectional video, and packing information corresponding to the second version of the omnidirectional video; packetizing the encoded information; and transmitting, to the user equipment, the packetized information.

The means for receiving the viewport information from the user equipment may comprise means for receiving signaling comprising at least one session description protocol message, wherein the signaling may comprise an indication of at least one mapping type supported by the user equipment, wherein the at least one supported mapping type may comprise at least one of: region-wise packing, modified region-wise packing, packed-picture mapping, or projected-picture mapping.

The example apparatus may further comprise means for transmitting, to the user equipment, using session description protocol signaling, packed picture mapping information separately from the packetized information, wherein the session description protocol signaling may comprise at least one of: an indication of a width of the region of the rotated projected picture of the first version of the omnidirectional video in the packed picture; an indication of the height of the region of the rotated projected picture of the first version of the omnidirectional video in the packed picture; an indication of a transform of the region of the rotated projected picture of the first version of the omnidirectional video in the packed picture; an indication of the width of the second version of the omnidirectional video in the packed picture; an indication of the height of the second version of the omnidirectional video in the packed picture; or an indication of a transform of the second version of the omnidirectional video in the packed picture.

The means for determining the region of the projected picture that corresponds to the received viewport information may comprise means for determining a region based on the size of the viewport and one or more margins applied to the viewport.

The example apparatus may further comprise means for signaling packed picture mapping information to the user equipment with one of: real-time transport protocol signaling, or supplemental enhancement information.

The means for encoding the information may comprise means for encoding with a single encoder, wherein the single encoder is configured to output with a resolution dependent on a size of the determined viewport, and independent of an orientation of the determined viewport.

In accordance with one example embodiment, a non-transitory computer-readable medium comprising program instructions stored thereon which, when executed with at least one processor, cause the at least one processor to: receive an omnidirectional video; generate a first version of the omnidirectional video with a first resolution; generate a second version of the omnidirectional video with a second resolution, wherein the first version has a higher quality than the second version; receive viewport information from a user equipment, where the viewport information may comprise, at least, a size of the viewport and an orientation of the viewport; project a picture of the first version of the omnidirectional video; determine a region of the projected picture that corresponds to the received viewport information; rotate the projected picture to reorient the determined region of the projected picture to a center of the projected picture; encode information, where the information may comprise: a packed picture comprising: the region of the rotated projected picture of the first version of the omnidirectional video, and the second version of the omnidirectional video, an indication of rotation information corresponding to the rotating of the projected picture of the first version of the omnidirectional video, and packing information corresponding to the second version of the omnidirectional video; packetize the encoded information; and transmit, to the user equipment, the packetized information.

Receiving the viewport information from the user equipment may comprise receiving signaling comprising at least one session description protocol message, wherein the signaling may comprise an indication of at least one mapping type supported by the user equipment, wherein the at least one supported mapping type may comprise at least one of: region-wise packing, modified region-wise packing, packed-picture mapping, or projected-picture mapping.

The program instructions stored thereon, when executed with the at least one processor, may further cause the at least one processor to: transmit, to the user equipment, using session description protocol signaling, packed picture mapping information separately from the packetized information, wherein the session description protocol signaling may comprise at least one of: an indication of a width of the region of the rotated projected picture of the first version of the omnidirectional video in the packed picture; an indication of the height of the region of the rotated projected picture of the first version of the omnidirectional video in the packed picture; an indication of a transform of the region of the rotated projected picture of the first version of the omnidirectional video in the packed picture; an indication of the width of the second version of the omnidirectional video in the packed picture; an indication of the height of the second version of the omnidirectional video in the packed picture; or an indication of a transform of the second version of the omnidirectional video in the packed picture.

Determining the region of the projected picture that corresponds to the received viewport information may comprise determining a region based on the size of the viewport and one or more margins applied to the viewport.

The program instructions stored thereon, when executed with the at least one processor, may further cause the at least one processor to: signal packed picture mapping information to the user equipment with one of: real-time transport protocol signaling, or supplemental enhancement information.

Encoding the information may comprise encoding with a single encoder, wherein the single encoder may be configured to output with a resolution dependent on a size of the determined viewport, and independent of an orientation of the determined viewport.

In accordance with one aspect, an example method may be provided comprising: receiving, with a media control unit, an omnidirectional video; receiving, with the media control unit, respective parameters from a plurality of user equipments, wherein the plurality of parameters may comprise at least viewport information; generating, with the media control unit, at least two tiled videos based on the received omnidirectional video, wherein a first of the at least two tiled videos comprises a higher quality than a second of the at least two tiled videos, or the first of the at least two tiled videos comprises a higher resolution than the second of the at least two tiled videos; extracting, with the media control unit, a respective first bit stream from the first tiled video based on the respective viewport information from the plurality of user equipments; extracting, with the media control unit, a respective second bit stream from the second tiled video for the plurality of user equipments; merging, with the media control unit, a corresponding first bit stream and a corresponding second bit stream to form a respective merged bit stream for the plurality of user equipments; encoding, with the media control unit, the plurality of merged bit streams; and transmitting, to respective ones of the plurality of user equipments, an encoded merged bit stream of the plurality of encoded merged bit streams corresponding to the respective parameters of the respective ones of the plurality of user equipments.

The respective parameters from the plurality of user equipments may comprise at least one of: a codec a respective user equipment supports; a viewport size of the respective user equipment; a field of view of the respective user equipment; an indication of a mapping method the respective user equipment supports; or an indication of a merging method the respective user equipment supports.

The codec the respective user equipment supports may comprise at least one of: advanced video coding; high-efficiency video coding; or versatile video coding.

The codec of at least one of the plurality of user equipments may comprise a high-efficiency video coding, wherein the at least two tiled videos may be motion-constrained tile sets, wherein the at least two tiled videos may be generated with a same prediction hierarchy, and wherein the at least two tiled videos may be generated with overlapping tiles.

The indication of the mapping method the respective user equipment supports may comprise at least one of: an indication of region-wise packing; or an indication of packed picture mapping.

The indication of the merging method the respective user equipment supports may comprise at least one of: a mixed-resolution mode of bitstream merging, or a mixed-quality mode of bitstream merging.

The at least two tiled videos may further comprise a third tiled video with a quality or resolution between that of the first tiled video and the second tiled video.

A viewport information from at least one of the plurality of user equipments may comprise viewport orientation information, wherein the extracting of the respective first bit stream from the first tiled video may comprise extracting a bit stream from the first tiled video based on the viewport orientation information for the at least one user equipment, and wherein the extracting of the respective second bit stream from the second tiled video may comprise extracting a bit stream from the second tiled video based on the viewport orientation information for the at least one user equipment.

The example method may further comprise separately signaling, to the plurality of user equipments, packing information corresponding to the transmitted encoded merged bit stream, wherein the signaling may comprise one of: signaling of at least one supplemental enhancement information message, or signaling of an extended real-time transport protocol header.

The packing information may comprise at least one of: a center of the first bit stream, wherein the first bit stream comprises a viewport region and at least one margin applied to the viewport, a number of regions of the first bit stream, a respective location of one or more regions in a packed picture, a respective shape of the one or more regions in the packed picture, a respective size of the one or more regions in the packed picture, width of the viewport region, a height of the viewport region, a top value of the viewport region, a left value of the viewport region, a packed region width, a packed region height, a packed region top value, a packed region left value, or a transform type.

The example method may further comprise signaling to the plurality of user equipments that periodic intra refresh is supported.

The example method may further comprise receiving, from at least one of the plurality of user equipments, an intra random access picture request.

The first tiled video may comprise a tiled video based on less than an entirety of the received omnidirectional video, wherein the extracting of the respective first bit stream from the first tiled video may comprise extracting at least one bit stream comprising content within an active region of a projected picture of the received omnidirectional video.

In accordance with one example embodiment, an apparatus may comprise: at least one processor; and at least one memory including computer program code; the at least one memory and the computer program code configured to, with the at least one processor, cause the apparatus to: receive an omnidirectional video; receive respective parameters from a plurality of user equipments, wherein the plurality of parameters may comprise at least viewport information; generate at least two tiled videos based on the received omnidirectional video, wherein a first of the at least two tiled videos may comprise a higher quality than a second of the at least two tiled videos, or the first of the at least two tiled videos may comprise a higher resolution than the second of the at least two tiled videos; extract a respective first bit stream from the first tiled video based on the respective viewport information from the plurality of user equipments; extract a respective second bit stream from the second tiled video for the plurality of user equipments; merge a corresponding first bit stream and a corresponding second bit stream to form a respective merged bit stream for the plurality of user equipments; encode the plurality of merged bit streams; and transmit, to respective ones of the plurality of user equipments, an encoded merged bit stream of the plurality of encoded merged bit streams corresponding to the respective parameters of the respective ones of the plurality of user equipments.

The respective parameters from the plurality of user equipments comprise at least one of: a codec a respective user equipment supports; a viewport size of the respective user equipment; a field of view of the respective user equipment; an indication of a mapping method the respective user equipment supports; or an indication of a merging method the respective user equipment supports.

The codec the respective user equipment supports may comprise at least one of: advanced video coding; high-efficiency video coding; or versatile video coding.

The codec of at least one of the plurality of user equipments may comprise a high-efficiency video coding, wherein the at least two tiled videos may be motion-constrained tile sets, wherein the at least two tiled videos may be generated with a same prediction hierarchy, and wherein the at least two tiled videos may be generated with overlapping tiles.

The indication of the mapping method the respective user equipment supports may comprise at least one of: an indication of region-wise packing; or an indication of packed picture mapping.

The indication of the merging method the respective user equipment supports comprises at least one of: a mixed-resolution mode of bitstream merging, or a mixed-quality mode of bitstream merging.

The at least two tiled videos may further comprise a third tiled video with a quality or resolution between that of the first tiled video and the second tiled video.

A viewport information from at least one of the plurality of user equipments may comprise viewport orientation information, wherein extracting the respective first bit stream from the first tiled video may comprise the at least one memory and the computer program code are configured to, with the at least one processor, cause the apparatus to extract a bit stream from the first tiled video based on the viewport orientation information for the at least one user equipment, and wherein extracting the respective second bit stream from the second tiled video may comprise the at least one memory and the computer program code are configured to, with the at least one processor, cause the apparatus to extract a bit stream from the second tiled video based on the viewport orientation information for the at least one user equipment.

The at least one memory and the computer program code may be configured to, with the at least one processor, cause the apparatus to: separately signal, to the plurality of user equipments, packing information corresponding to the transmitted encoded merged bit stream, wherein the signaling may comprise one of: signaling of at least one supplemental enhancement information message, or signaling of an extended real-time transport protocol header.

The packing information may comprise at least one of: a center of the first bit stream, wherein the first bit stream may comprise a viewport region and at least one margin applied to the viewport, a number of regions of the first bit stream, a respective location of one or more regions in a packed picture, a respective shape of the one or more regions in the packed picture, a respective size of the one or more regions in the packed picture, a width of the viewport region, a height of the viewport region, a top value of the viewport region, a left value of the viewport region, a packed region width, a packed region height, a packed region top value, a packed region left value, or a transform type.

The at least one memory and the computer program code may be configured to, with the at least one processor, cause the apparatus to: signal to the plurality of user equipments that periodic intra refresh is supported.

The at least one memory and the computer program code may be configured to, with the at least one processor, cause the apparatus to: receive, from at least one of the plurality of user equipments, an intra random access picture request.

The first tiled video may comprise a tiled video based on less than an entirety of the received omnidirectional video, wherein extracting the respective first bit stream from the first tiled video may comprise the at least one memory and the computer program code are configured to, with the at least one processor, cause the apparatus to extract at least one bit stream comprising content within an active region of a projected picture of the received omnidirectional video.

In accordance with one example embodiment, an apparatus may comprise: circuitry configured to perform: receive an omnidirectional video; receive respective parameters from a plurality of user equipments, wherein the plurality of parameters may comprise at least viewport information; generate at least two tiled videos based on the received omnidirectional video, wherein a first of the at least two tiled videos may comprise a higher quality than a second of the at least two tiled videos, or the first of the at least two tiled videos may comprise a higher resolution than the second of the at least two tiled videos; extract a respective first bit stream from the first tiled video based on the respective viewport information from the plurality of user equipments; extract a respective second bit stream from the second tiled video for the plurality of user equipments; merge a corresponding first bit stream and a corresponding second bit stream to form a respective merged bit stream for the plurality of user equipments; encode the plurality of merged bit streams; and transmit, to respective ones of the plurality of user equipments, an encoded merged bit stream of the plurality of encoded merged bit streams corresponding to the respective parameters of the respective ones of the plurality of user equipments.

In accordance with one example embodiment, an apparatus may comprise: processing circuitry; memory circuitry including computer program code, the memory circuitry and the computer program code configured to, with the processing circuitry, enable the apparatus to: receive an omnidirectional video; receive respective parameters from a plurality of user equipments, wherein the plurality of parameters may comprise at least viewport information; generate at least two tiled videos based on the received omnidirectional video, wherein a first of the at least two tiled videos may comprise a higher quality than a second of the at least two tiled videos, or the first of the at least two tiled videos may comprise a higher resolution than the second of the at least two tiled videos; extract a respective first bit stream from the first tiled video based on the respective viewport information from the plurality of user equipments; extract a respective second bit stream from the second tiled video for the plurality of user equipments; merge a corresponding first bit stream and a corresponding second bit stream to form a respective merged bit stream for the plurality of user equipments; encode the plurality of merged bit streams; and transmit, to respective ones of the plurality of user equipments, an encoded merged bit stream of the plurality of encoded merged bit streams corresponding to the respective parameters of the respective ones of the plurality of user equipments.

In accordance with one example embodiment, an apparatus may comprise means for performing: receiving an omnidirectional video; receiving respective parameters from a plurality of user equipments, wherein the plurality of parameters may comprise at least viewport information; generating at least two tiled videos based on the received omnidirectional video, wherein a first of the at least two tiled videos may comprise a higher quality than a second of the at least two tiled videos, or the first of the at least two tiled videos may comprise a higher resolution than the second of the at least two tiled videos; extracting a respective first bit stream from the first tiled video based on the respective viewport information from the plurality of user equipments; extracting a respective second bit stream from the second tiled video for the plurality of user equipments; merging a corresponding first bit stream and a corresponding second bit stream to form a respective merged bit stream for the plurality of user equipments; encoding the plurality of merged bit streams; and transmitting, to respective ones of the plurality of user equipments, an encoded merged bit stream of the plurality of encoded merged bit streams corresponding to the respective parameters of the respective ones of the plurality of user equipments.

The respective parameters from the plurality of user equipments may comprise at least one of: a codec a respective user equipment supports; a viewport size of the respective user equipment; a field of view of the respective user equipment; an indication of a mapping method the respective user equipment supports; or an indication of a merging method the respective user equipment supports.

The codec the respective user equipment supports may comprise at least one of: advanced video coding; high-efficiency video coding; or versatile video coding.

The codec of at least one of the plurality of user equipments may comprise a high-efficiency video coding, wherein the at least two tiled videos may be motion-constrained tile sets, wherein the at least two tiled videos may be generated with a same prediction hierarchy, and wherein the at least two tiled videos may be generated with overlapping tiles.

The indication of the mapping method the respective user equipment supports may comprise at least one of: an indication of region-wise packing; or an indication of packed picture mapping.

The indication of the merging method the respective user equipment supports comprises at least one of: a mixed-resolution mode of bitstream merging, or a mixed-quality mode of bitstream merging.

The at least two tiled videos may further comprise a third tiled video with a quality or resolution between that of the first tiled video and the second tiled video.

A viewport information from at least one of the plurality of user equipments may comprise viewport orientation information, wherein the means for extracting the respective first bit stream from the first tiled video may comprise means for extracting a bit stream from the first tiled video based on the viewport orientation information for the at least one user equipment, and wherein the means for extracting the respective second bit stream from the second tiled video may comprise means for extracting a bit stream from the second tiled video based on the viewport orientation information for the at least one user equipment.

The example apparatus may further comprise means for separately signaling, to the plurality of user equipments, packing information corresponding to the transmitted encoded merged bit stream, wherein the signaling may comprise one of: signaling of at least one supplemental enhancement information message, or signaling of an extended real-time transport protocol header.

The packing information may comprise at least one of: a center of the first bit stream, wherein the first bit stream may comprise a viewport region and at least one margin applied to the viewport, a number of regions of the first bit stream, a respective location of one or more regions in a packed picture, a respective shape of the one or more regions in the packed picture, a respective size of the one or more regions in the packed picture, a width of the viewport region, a height of the viewport region, a top value of the viewport region, a left value of the viewport region, a packed region width, a packed region height, a packed region top value, a packed region left value, or a transform type.

The example apparatus may further comprise means for signaling to the plurality of user equipments that periodic intra refresh is supported.

The example apparatus may further comprise means for receiving, from at least one of the plurality of user equipments, an intra random access picture request.

The first tiled video may comprise a tiled video based on less than an entirety of the received omnidirectional video, wherein the means for extracting the respective first bit stream from the first tiled video may comprise means for extracting at least one bit stream comprising content within an active region of a projected picture of the received omnidirectional video.

In accordance with one example embodiment, a non-transitory computer-readable medium comprising program instructions stored thereon which, when executed with at least one processor, cause the at least one processor to: receive an omnidirectional video; receive respective parameters from a plurality of user equipments, wherein the plurality of parameters may comprise at least viewport information; generate at least two tiled videos based on the received omnidirectional video, wherein a first of the at least two tiled videos may comprise a higher quality than a second of the at least two tiled videos, or the first of the at least two tiled videos may comprises a higher resolution than the second of the at least two tiled videos; extract a respective first bit stream from the first tiled video based on the respective viewport information from the plurality of user equipments; extract a respective second bit stream from the second tiled video for the plurality of user equipments; merge a corresponding first bit stream and a corresponding second bit stream to form a respective merged bit stream for the plurality of user equipments; encode the plurality of merged bit streams; and transmit, to respective ones of the plurality of user equipments, an encoded merged bit stream of the plurality of encoded merged bit streams corresponding to the respective parameters of the respective ones of the plurality of user equipments.

The respective parameters from the plurality of user equipments may comprise at least one of: a codec a respective user equipment supports; a viewport size of the respective user equipment; a field of view of the respective user equipment; an indication of a mapping method the respective user equipment supports; or an indication of a merging method the respective user equipment supports.

The codec the respective user equipment supports may comprise at least one of: advanced video coding; high-efficiency video coding; or versatile video coding.

The codec of at least one of the plurality of user equipments may comprise a high-efficiency video coding, wherein the at least two tiled videos may be motion-constrained tile sets, wherein the at least two tiled videos may be generated with a same prediction hierarchy, and wherein the at least two tiled videos may be generated with overlapping tiles.

The indication of the mapping method the respective user equipment supports may comprise at least one of: an indication of region-wise packing; or an indication of packed picture mapping.

The indication of the merging method the respective user equipment supports comprises at least one of: a mixed-resolution mode of bitstream merging, or a mixed-quality mode of bitstream merging.

The at least two tiled videos may further comprise a third tiled video with a quality or resolution between that of the first tiled video and the second tiled video.

A viewport information from at least one of the plurality of user equipments may comprise viewport orientation information, wherein extracting the respective first bit stream from the first tiled video may comprise program instructions stored thereon which, when executed with the at least one processor, cause the at least one processor to extract a bit stream from the first tiled video based on the viewport orientation information for the at least one user equipment, and wherein extracting the respective second bit stream from the second tiled video may comprise program instructions stored thereon which, when executed with the at least one processor, cause the at least one processor to extract a bit stream from the second tiled video based on the viewport orientation information for the at least one user equipment.

The program instructions stored thereon, when executed with the at least one processor, may cause the at least one processor to: separately signal, to the plurality of user equipments, packing information corresponding to the transmitted encoded merged bit stream, wherein the signaling may comprise one of: signaling of at least one supplemental enhancement information message, or signaling of an extended real-time transport protocol header.

The packing information may comprise at least one of: a center of the first bit stream, wherein the first bit stream comprises a viewport region and at least one margin applied to the viewport, a number of regions of the first bit stream, a respective location of one or more regions in a packed picture, a respective shape of the one or more regions in the packed picture, a respective size of the one or more regions in the packed picture, a width of the viewport region, a height of the viewport region, a top value of the viewport region, a left value of the viewport region, a packed region width, a packed region height, a packed region top value, a packed region left value, or a transform type.

The program instructions stored thereon, when executed with the at least one processor, may cause the at least one processor to: signal to the plurality of user equipments that periodic intra refresh is supported.

The program instructions stored thereon, when executed with the at least one processor, may cause the at least one processor to: receive, from at least one of the plurality of user equipments, an intra random access picture request.

The first tiled video may comprise a tiled video based on less than an entirety of the received omnidirectional video, wherein extracting the respective first bit stream from the first tiled video may comprise program instructions stored thereon which, when executed with the at least one processor, cause the at least one processor to extract at least one bit stream comprising content within an active region of a projected picture of the received omnidirectional video.

In accordance with one aspect, an example method may be provided comprising: receiving an omnidirectional video; receiving, from at least one user equipment, viewport information; determining a region of the omnidirectional video based on the viewport information; generating a video stream comprising content corresponding to the determined region and other content corresponding to other regions of the omnidirectional video, wherein the content may comprise a higher quality than the other content; and transmitting the video stream to the at least one user equipment.

The viewport information may comprise a viewport size, at least one margin, and a viewport orientation.

The generating of the video stream may comprise encoding the content and other content, and packetizing the encoded content and other content.

In accordance with one example embodiment, an apparatus may comprise: at least one processor; and at least one memory including computer program code; the at least one memory and the computer program code configured to, with the at least one processor, cause the apparatus to: receive an omnidirectional video; receive from at least one user equipment, viewport information; determine a region of the omnidirectional video based on the viewport information; generate a video stream comprising content corresponding to the determined region and other content corresponding to other regions of the omnidirectional video, wherein the content may comprise a higher quality than the other content; and transmit the video stream to the at least one user equipment.

The viewport information may comprise a viewport size, at least one margin, and a viewport orientation.

Generating the video stream may comprise the at least one memory and the computer program code are configured to, with the at least one processor, cause the apparatus to: encode the content and other content, and packetize the encoded content and other content.

In accordance with one example embodiment, an apparatus may comprise: circuitry configured to perform: receive an omnidirectional video; receive from at least one user equipment, viewport information; determine a region of the omnidirectional video based on the viewport information; generate a video stream comprising content corresponding to the determined region and other content corresponding to other regions of the omnidirectional video, wherein the content may comprise a higher quality than the other content; and transmit the video stream to the at least one user equipment.

In accordance with one example embodiment, an apparatus may comprise: processing circuitry; memory circuitry including computer program code, the memory circuitry and the computer program code configured to, with the processing circuitry, enable the apparatus to: receive an omnidirectional video; receive from at least one user equipment, viewport information; determine a region of the omnidirectional video based on the viewport information; generate a video stream comprising content corresponding to the determined region and other content corresponding to other regions of the omnidirectional video, wherein the content may comprise a higher quality than the other content; and transmit the video stream to the at least one user equipment.

In accordance with one example embodiment, an apparatus may comprise means for performing: receiving an omnidirectional video; receiving, from at least one user equipment, viewport information; determining a region of the omnidirectional video based on the viewport information; generating a video stream comprising content corresponding to the determined region and other content corresponding to other regions of the omnidirectional video, wherein the content may comprise a higher quality than the other content; and transmitting the video stream to the at least one user equipment.

The viewport information may comprise a viewport size, at least one margin, and a viewport orientation.

The means for generating the video stream may comprise means for: encoding the content and other content, and packetizing the encoded content and other content.

In accordance with one example embodiment, a non-transitory computer-readable medium comprising program instructions stored thereon which, when executed with at least one processor, cause the at least one processor to: receive an omnidirectional video; receive from at least one user equipment, viewport information; determine a region of the omnidirectional video based on the viewport information; generate a video stream comprising content corresponding to the determined region and other content corresponding to other regions of the omnidirectional video, wherein the content may comprise a higher quality than the other content; and transmit the video stream to the at least one user equipment.

The viewport information may comprise a viewport size, at least one margin, and a viewport orientation.

Generating the video stream may comprise program instructions stored thereon which, when executed with the at least one processor, cause the at least one processor to: encode the content and other content, and packetize the encoded content and other content.

In accordance with one aspect, an example method may be provided comprising: receiving an omnidirectional video; determining a viewport of a user equipment; determining a delivery mode; determining a region of the omnidirectional video based, at least partially, on the determined viewport and the determined delivery mode; encoding information, where the information may comprise: first content having a first resolution, wherein the first content comprises content associated with the determined region, and second content having a second resolution, wherein the second content comprises content associated with the omnidirectional video, wherein the first content may have a higher quality than the second content, wherein the information may further comprise at least one of: rotation information corresponding to the first content, or packing information; and transmitting the encoded information to the user equipment based, at least partially, on the determined delivery mode.

The determining of the delivery mode may be based, at least partially, on a received session description protocol message or real-time transport control protocol message, wherein the received message may comprise an indication that the user equipment supports at least one of a sphere-locked delivery mode or a viewport-locked delivery mode.

The determined delivery mode may comprise a viewport-locked delivery mode, wherein the determining of the region of the omnidirectional video may comprise: projecting a picture of the omnidirectional video; determining a region of the projected picture that corresponds to the determined viewport; and rotating the projected picture to reorient the determined region of the projected picture to a center of the projected picture.

The determined delivery mode may comprise a sphere-locked delivery mode, wherein the determining of the region of the omnidirectional video may comprise mapping the determined viewport to the omnidirectional video, wherein the encoded information may comprise global coordinates of the determined region within the omnidirectional video, wherein the global coordinates may be transmitted with one of: a supplemental enhancement information message, an extended real-time transport protocol header, or a signal transmitted with a real-time transport protocol stream separate from a video stream with which the first content and the second content delivered to the user equipment.

The example method may further comprise: receiving viewport information from the user equipment, wherein the viewport information may comprise at least one of: field of view information of the user equipment, region of interest information of the user equipment, a size of the viewport, an orientation of the viewport, an elevation of the viewport, a range of the elevation of the viewport, an azimuth of the viewport, a range of the azimuth of the viewport, a tilt of the viewport, or a zoom factor, wherein the determining of the viewport may be based, at least partially, on the received viewport information.

The example method may further comprise: receiving at least one session description protocol message, wherein the at least one session description protocol message may comprise an indication of at least one mapping type supported by the user equipment, wherein the at least one supported mapping type may comprise at least one of: region-wise packing, modified region-wise packing, packed-picture mapping, or projected-picture mapping.

The example method may further comprise: transmitting, to the user equipment, session description protocol signaling, wherein the session description protocol signaling may comprise at least one of: an indication of a width of the first content in a packed picture; an indication of a height of the first content in the packed picture; an indication of a transform of the first content in the packed picture; an indication of a width of the second content in the packed picture; an indication of a height of the second content in the packed picture; or an indication of a transform of the second content in the packed picture.

The example method may further comprise: signaling packed picture mapping information to the user equipment with one of: real-time transport protocol signaling, or supplemental enhancement information.

The example method may further comprise: generating at least two tiled videos based on the received omnidirectional video, wherein: a first of the at least two tiled videos may comprise a higher quality than a second of the at least two tiled videos, or the first of the at least two tiled videos comprises a higher resolution than the second of the at least two tiled videos, wherein the first content may comprise one or more tiles of the first of the at least two tiled videos, wherein the second content comprises one or more tiles of the second of the at least two tiled videos.

The example method may further comprise: extracting the first content from the first of the at least two tiled videos; extracting the second content from the second of the at least two tiled videos; and merging the first content and the second content to form a merged bit stream, wherein the merging may be based, at least partially, on a merging method the user equipment supports, wherein the merging method the user equipment supports may comprise at least one of: a mixed-resolution mode of bitstream merging, or a mixed-quality mode of bitstream merging, wherein the encoded information may comprise, at least, the merged bit stream.

In accordance with one example embodiment, an apparatus may comprise: at least one processor; and at least one memory including computer program code; the at least one memory and the computer program code configured to, with the at least one processor, cause the apparatus at least to perform: receive an omnidirectional video; determine a viewport of a user equipment; determine a delivery mode; determine a region of the omnidirectional video based, at least partially, on the determined viewport and the determined delivery mode; encode information, where the information may comprise: first content having a first resolution, wherein the first content may comprise content associated with the determined region, and second content having a second resolution, wherein the second content may comprise content associated with the omnidirectional video, wherein the first content has a higher quality than the second content, wherein the information may further comprise at least one of: rotation information corresponding to the first content, or packing information; and transmit the encoded information to the user equipment based, at least partially, on the determined delivery mode.

Determining the delivery mode may be based, at least partially, on a received session description protocol message or real-time transport control protocol message, wherein the received message may comprise an indication that the user equipment supports at least one of a sphere-locked delivery mode or a viewport-locked delivery mode.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modification and variances which fall within the scope of the appended claims.

What is claimed is:

1. A method comprising:
receiving an omnidirectional video;
generating a first version of the omnidirectional video with a first resolution;
generating a second version of the omnidirectional video with a second resolution, wherein the first version has a higher quality than the second version;
receiving viewport information from a user equipment, where the viewport information comprises, at least, a size of the viewport and an orientation of the viewport;
projecting a picture of the first version of the omnidirectional video;
determining a region of the projected picture that corresponds to the received viewport information;
rotating the projected picture to reorient the determined region of the projected picture to a center of the projected picture;
encoding information, where the information comprises:
a packed picture comprising:
the region of the rotated projected picture of the first version of the omnidirectional video, and
the second version of the omnidirectional video,
an indication of rotation information corresponding to the rotating of the projected picture of the first version of the omnidirectional video, and
packing information corresponding to the second version of the omnidirectional video, wherein the packing information comprises static packing information in response to the rotating of the projected picture;
packetizing the encoded information; and
transmitting, to the user equipment, the packetized information.

2. The method of claim 1, wherein the receiving of the viewport information from the user equipment comprises receiving signaling comprising at least one session description protocol message, wherein the signaling comprises an indication of at least one mapping type supported by the user equipment, wherein the at least one supported mapping type comprises at least one of:
region-wise packing,
modified region-wise packing,
packed-picture mapping, or
projected-picture mapping.

3. The method of claim 1, further comprising transmitting, to the user equipment, using session description protocol signaling, packed picture mapping information separately from the packetized information, wherein the session description protocol signaling comprises at least one of:
- an indication of a width of the region of the rotated projected picture of the first version of the omnidirectional video in the packed picture;
- an indication of the height of the region of the rotated projected picture of the first version of the omnidirectional video in the packed picture;
- an indication of a transform of the region of the rotated projected picture of the first version of the omnidirectional video in the packed picture;
- an indication of the width of the second version of the omnidirectional video in the packed picture;
- an indication of the height of the second version of the omnidirectional video in the packed picture; or
- an indication of a transform of the second version of the omnidirectional video in the packed picture.

4. The method of claim 1, wherein the determining of the region of the projected picture that corresponds to the received viewport information comprises determining a region based on the size of the viewport and one or more margins applied to the viewport.

5. The method of claim 1, further comprising signaling packed picture mapping information to the user equipment with one of:
- real-time transport protocol signaling, or
- supplemental enhancement information.

6. The method of claim 1, wherein the encoding of the information comprises encoding with a single encoder, wherein the single encoder is configured to output with a resolution dependent on a size of the determined viewport, and independent of an orientation of the determined viewport.

7. An apparatus comprising:
- at least one processor; and
- at least one non-transitory memory and computer program code, wherein the at least one memory and the computer program code are configured to, with the at least one processor, cause the apparatus to:
  - receive an omnidirectional video;
  - generate a first version of the omnidirectional video with a first resolution;
  - generate a second version of the omnidirectional video with a second resolution, wherein the first version has a higher quality than the second version;
  - receive viewport information from a user equipment, where the viewport information comprises, at least, a size of the viewport and an orientation of the viewport;
  - project a picture of the first version of the omnidirectional video;
  - determine a region of the projected picture that corresponds to the received viewport information;
  - rotate the projected picture to reorient the determined region of the projected picture to a center of the projected picture;
  - encode information, where the information comprises:
    - a packed picture comprising:
      - the region of the rotated projected picture of the first version of the omnidirectional video, and
      - the second version of the omnidirectional video,
    - an indication of rotation information corresponding to the rotating of the projected picture of the first version of the omnidirectional video, and
    - packing information corresponding to the second version of the omnidirectional video, wherein the packing information comprises static packing information in response to the rotating of the projected picture;
  - packetize the encoded information; and
  - transmit, to the user equipment, the packetized information.

8. The apparatus of claim 7, wherein receiving the viewport information from the user equipment comprises receiving signaling comprising at least one session description protocol message, wherein the signaling comprises an indication of at least one mapping type supported by the user equipment, wherein the at least one supported mapping type comprises at least one of:
- region-wise packing,
- modified region-wise packing,
- packed-picture mapping, or
- projected-picture mapping.

9. The apparatus of claim 7, wherein the at least one memory and the computer program code are configured to, with the at least one processor, further cause the apparatus to:
- transmit, to the user equipment, using session description protocol signaling, packed picture mapping information separately from the packetized information, wherein the session description protocol signaling comprises at least one of:
  - an indication of a width of the region of the rotated projected picture of the first version of the omnidirectional video in the packed picture;
  - an indication of the height of the region of the rotated projected picture of the first version of the omnidirectional video in the packed picture;
  - an indication of a transform of the region of the rotated projected picture of the first version of the omnidirectional video in the packed picture;
  - an indication of the width of the second version of the omnidirectional video in the packed picture;
  - an indication of the height of the second version of the omnidirectional video in the packed picture; or
  - an indication of a transform of the second version of the omnidirectional video in the packed picture.

10. The apparatus of claim 7, wherein determining the region of the projected picture that corresponds to the received viewport information comprises determining a region based on the size of the viewport and one or more margins applied to the viewport.

11. The apparatus of claim 7, wherein the at least one memory and the computer program code are configured to, with the at least one processor, further cause the apparatus to:
- signal packed picture mapping information to the user equipment with one of:
  - real-time transport protocol signaling, or
  - supplemental enhancement information.

12. The apparatus of claim 7, wherein encoding the information comprises encoding with a single encoder, wherein the single encoder is configured to output with a resolution dependent on a size of the determined viewport, and independent of an orientation of the determined viewport.

13. A non-transitory computer-readable medium comprising program instructions stored thereon which, when executed with at least one processor, cause the at least one processor to:
- receive an omnidirectional video;
- generate a first version of the omnidirectional video with a first resolution;

generate a second version of the omnidirectional video with a second resolution, wherein the first version has a higher quality than the second version;

receive viewport information from a user equipment, where the viewport information comprises, at least, a size of the viewport and an orientation of the viewport;

project a picture of the first version of the omnidirectional video;

determine a region of the projected picture that corresponds to the received viewport information;

rotate the projected picture to reorient the determined region of the projected picture to a center of the projected picture;

encode information, where the information comprises:
    a packed picture comprising:
        the region of the rotated projected picture of the first version of the omnidirectional video, and
        the second version of the omnidirectional video,
    an indication of rotation information corresponding to the rotating of the projected picture of the first version of the omnidirectional video, and
    packing information corresponding to the second version of the omnidirectional video, wherein the packing information comprises static packing information in response to the rotating of the projected picture;

packetize the encoded information; and transmit, to the user equipment, the packetized information.

14. The computer-readable medium of claim 13, wherein receiving the viewport information from the user equipment comprises receiving signaling comprising at least one session description protocol message, wherein the signaling comprises an indication of at least one mapping type supported by the user equipment, wherein the at least one supported mapping type comprises at least one of:
    region-wise packing,
    modified region-wise packing,
    packed-picture mapping, or
    projected-picture mapping.

15. The computer-readable medium of claim 13, wherein the program instructions stored thereon, when executed with the at least one processor, further cause the at least one processor to:
    transmit, to the user equipment, using session description protocol signaling, packed picture mapping information separately from the packetized information, wherein the session description protocol signaling comprises at least one of:
        an indication of a width of the region of the rotated projected picture of the first version of the omnidirectional video in the packed picture;
        an indication of the height of the region of the rotated projected picture of the first version of the omnidirectional video in the packed picture;
        an indication of a transform of the region of the rotated projected picture of the first version of the omnidirectional video in the packed picture;
        an indication of the width of the second version of the omnidirectional video in the packed picture;
        an indication of the height of the second version of the omnidirectional video in the packed picture; or
        an indication of a transform of the second version of the omnidirectional video in the packed picture.

16. The computer-readable medium of claim 13, wherein determining the region of the projected picture that corresponds to the received viewport information comprises determining a region based on the size of the viewport and one or more margins applied to the viewport.

17. The computer-readable medium of claim 13, wherein the program instructions stored thereon, when executed with the at least one processor, further cause the at least one processor to:
    signal packed picture mapping information to the user equipment with one of:
        real-time transport protocol signaling, or
        supplemental enhancement information.

18. The computer-readable medium of claim 13, wherein encoding the information comprises encoding with a single encoder, wherein the single encoder is configured to output with a resolution dependent on a size of the determined viewport, and independent of an orientation of the determined viewport.

19. An apparatus comprising:
    at least one processor; and
    at least one non-transitory memory and computer program code, wherein the at least one memory and the computer program code are configured to, with the at least one processor, cause the apparatus to:
    receive an omnidirectional video;
    determine a viewport of a user equipment;
    determine a delivery mode, wherein the determined delivery mode comprises one of: a sphere-locked delivery mode, or a viewport-locked delivery mode;
    determine a region of the omnidirectional video based, at least partially, on the determined viewport and the determined delivery mode;
    encode information, where the information comprises:
        first content having a first resolution, wherein the first content comprises content associated with the determined region, and
        second content having a second resolution, wherein the second content comprises content associated with the omnidirectional video, wherein the first content has a higher quality than the second content,
    wherein the information further comprises at least one of:
        rotation information corresponding to the first content, or
        packing information; and
    transmit the encoded information to the user equipment based, at least partially, on the determined delivery mode.

20. The apparatus of claim 19, wherein determining the delivery mode is based, at least partially, on a received session description protocol message or real-time transport control protocol message, wherein the received message comprises an indication that the user equipment supports at least one of the sphere-locked delivery mode or the viewport-locked delivery mode.

* * * * *